(12) United States Patent
Kamoshita et al.

(10) Patent No.: US 10,385,545 B2
(45) Date of Patent: Aug. 20, 2019

(54) CONTROL SYSTEM, WORK MACHINE, AND CONTROL METHOD

(71) Applicant: Komatsu Ltd., Tokyo (JP)

(72) Inventors: Yuta Kamoshita, Hiratsuka (JP); Tadashi Kawaguchi, Hiratsuka (JP); Teruo Akiyama, Kokubunji (JP)

(73) Assignee: Komatsu Ltd., Tokyo (JP)

( * ) Notice: Subject to any disclaimer, the term of this patent is extended or adjusted under 35 U.S.C. 154(b) by 80 days.

(21) Appl. No.: 15/506,799

(22) PCT Filed: Jul. 29, 2016

(86) PCT No.: PCT/JP2016/072448
§ 371 (c)(1),
(2) Date: Feb. 27, 2017

(87) PCT Pub. No.: WO2017/014324
PCT Pub. Date: Jan. 26, 2017

(65) Prior Publication Data
US 2018/0030692 A1 Feb. 1, 2018

(51) Int. Cl.
*E02F 9/22* (2006.01)
*F15B 11/17* (2006.01)
*F15B 19/00* (2006.01)
*F15B 11/16* (2006.01)
*F16H 61/4008* (2010.01)
*F16H 61/47* (2010.01)

(52) U.S. Cl.
CPC .......... *E02F 9/2228* (2013.01); *E02F 9/2242* (2013.01); *E02F 9/2253* (2013.01);
(Continued)

(58) Field of Classification Search
CPC ................ F15B 11/17; F15B 2211/365; F15B 2211/6313; F15B 2211/6323; F15B 19/007; E02F 9/2242; E02F 9/2228
See application file for complete search history.

(56) References Cited

U.S. PATENT DOCUMENTS 5,063,739 A * 11/1991 Bianchetta ............. F15B 11/17
60/421
7,350,353 B2 4/2008 Ioku
(Continued)

FOREIGN PATENT DOCUMENTS

DE 102008011016 A1 8/2009
EP 1666735 A1 6/2006
(Continued)

OTHER PUBLICATIONS

International Search Report and Written Opinion dated Oct. 25, 2016, issued for PCT/JP2016/072448.
(Continued)

*Primary Examiner* — Abiy Teka
(74) *Attorney, Agent, or Firm* — Locke Lord LLP

(57) ABSTRACT

A control system includes a cylinder pressure data acquisition unit that acquires cylinder pressure data indicating a pressure of operating oil of a hydraulic cylinder; an operation amount data acquisition unit that acquires operation amount data of an operating device; a pump flow rate calculation unit that calculates a first pump flow rate indicating a flow rate of the operating oil discharged from a first hydraulic pump and a second pump flow rate indicating a flow rate of the operating oil discharged from a second hydraulic pump in a splitting state in which a passage is closed based on the cylinder pressure data and the operation amount data; and a pump control unit that controls the first hydraulic pump and the second hydraulic pump based on the first pump flow rate and the second pump flow rate.

7 Claims, 12 Drawing Sheets

(52) U.S. Cl.
CPC .......... *E02F 9/2296* (2013.01); *F15B 11/163* (2013.01); *F15B 11/17* (2013.01); *F15B 19/007* (2013.01); *F16H 61/4008* (2013.01); *F16H 61/47* (2013.01); *F15B 2211/20546* (2013.01); *F15B 2211/20576* (2013.01); *F15B 2211/3054* (2013.01); *F15B 2211/30595* (2013.01); *F15B 2211/6309* (2013.01); *F15B 2211/6313* (2013.01); *F15B 2211/6333* (2013.01); *F15B 2211/6652* (2013.01); *F15B 2211/6654* (2013.01)

(56) References Cited

U.S. PATENT DOCUMENTS

| | | | |
|---|---|---|---|
| 7,520,130 B2* | 4/2009 | Tanaka | F15B 11/17 60/421 |
| 9,394,671 B2* | 7/2016 | Hirozawa | E02F 9/2217 |

| | | | |
|---|---|---|---|
| 2011/0056192 A1 | 3/2011 | Weber et al. | |
| 2015/0040552 A1 | 2/2015 | Hashimoto | |
| 2015/0354167 A1 | 12/2015 | Goto et al. | |

FOREIGN PATENT DOCUMENTS

| | | |
|---|---|---|
| JP | 03-260401 A | 11/1991 |
| JP | 09-210005 A | 8/1997 |
| JP | 2014-009794 A | 1/2014 |
| JP | 2014-126126 A | 7/2014 |
| KR | 10-2014-0137435 A | 12/2014 |
| WO | 2005/047709 A1 | 5/2005 |

OTHER PUBLICATIONS

Office Action dated Dec. 13, 2018 in the corresponding German patent application No. 112016000103.7.

* cited by examiner

100
CONTROL SYSTEM, WORK MACHINE, AND CONTROL METHOD

CROSS REFERENCE TO RELATED APPLICATIONS

This application is related to co-pending application: "CONTROL SYSTEM, WORK MACHINE, AND CONTROL METHOD" filed even date herewith in the names of Yuta KAMOSHITA, Tadashi KAWAGUCHI, Teruo AKIYAMA and Kenji OSHIMA as a national phase entry of PCT/JP2016/075089, which application is assigned to the assignee of the present application and is incorporated by reference herein.

FIELD

The present invention relates to a control system, a work machine, and a control method.

BACKGROUND

A work machine like an excavator includes a working unit having a bucket, an arm, and a boom. A plurality of hydraulic pumps is mounted on the work machine as a drive source of a hydraulic cylinder that drives the working unit.

Patent Literature 1 discloses a hydraulic circuit including a merging and splitting valve that switches between a merging state in which operating oil discharged from a first hydraulic pump and operating oil discharged from a second hydraulic pump merge together and a splitting state in which the operating oil from the two hydraulic pumps is split. When the first hydraulic pump and the second hydraulic pump are in the merging state, the operating oil discharged from the first hydraulic pump and the operating oil discharged from the second hydraulic pump are merged by the merging and splitting valve and are distributed to a plurality of hydraulic cylinders. When the first hydraulic pump and the second hydraulic pump are in the splitting state, a boom cylinder operates with the operating oil discharged from the first hydraulic pump and a bucket cylinder and an arm cylinder operate with the operating oil discharged from the second hydraulic pump.

Patent Literature 2 discloses a technique of providing a pressure compensation valve between a main operating valve and a hydraulic actuator to equalize a front-rear pressure difference of a main operating valve connected to each of the plurality of hydraulic cylinders when a first hydraulic pump and a second hydraulic pump are in a merging state. When the front-rear pressure difference of the plurality of main operating valves is equalized, since operating oil is supplied to the hydraulic cylinder with a flow rate corresponding to an operation amount of an operating device, a decrease in the operability of the operating device is suppressed.

CITATION LIST

Patent Literature

Patent Literature 1: Japanese Patent Application Laid-open No. 3-260401
Patent Literature 2: International Publication Pamphlet No. WO 2005/047709

SUMMARY

Technical Problem

In the splitting state of the first hydraulic pump and the second hydraulic pump, when the first hydraulic pump and the second hydraulic pump are controlled based on a pump pressure indicating the pressure of the operating oil discharged from the first hydraulic pump and the second hydraulic pump, an operating oil of the flow rate required for driving the working unit may not be sufficiently supplied to the hydraulic cylinder. As a result, when the merging state switches to the splitting state, the working unit does not operate at a sufficient speed and responsiveness and the working efficiency of the working unit decreases.

An object of some aspects of the present invention is to provide a control system, a work machine, and a control method capable of controlling a working unit at a sufficient speed and responsiveness in a splitting state.

Solution to Problem

According to a first aspect of the present invention, a control system that controls a work machine including a working unit and a plurality of hydraulic cylinders that drives the working unit, comprises: a first hydraulic pump and a second hydraulic pump that discharge operating oil to be supplied to the hydraulic cylinder; a passage that connects the first hydraulic pump and the second hydraulic pump; an opening and closing device that is provided in the passage so as to open and close the passage; an operating device that is operated to drive the hydraulic cylinder; a cylinder pressure data acquisition unit that acquires cylinder pressure data indicating a pressure of the operating oil of the hydraulic cylinder; an operation amount data acquisition unit that acquires operation amount data of the operating device; a pump flow rate calculation unit that calculates a first pump flow rate indicating a flow rate of the operating oil discharged from the first hydraulic pump and a second pump flow rate indicating a flow rate of the operating oil discharged from the second hydraulic pump in a splitting state in which the passage is closed based on the cylinder pressure data and the operation amount data; and a pump control unit that controls the first hydraulic pump and the second hydraulic pump based on the first pump flow rate and the second pump flow rate.

According to a second aspect of the present invention, a work machine comprises the control system according to the first aspect.

According to a third aspect of the present invention, a control method of controlling a work machine including a working unit and a plurality of hydraulic cylinders that drives the working unit, comprises: discharging operating oil to be supplied to the hydraulic cylinder from a first hydraulic pump and a second hydraulic pump; acquiring cylinder pressure data indicating a pressure of the operating oil of the hydraulic cylinder; acquiring operation amount data of an operating device operated to drive the hydraulic cylinder; calculating a first pump flow rate indicating a flow rate of the operating oil discharged from the first hydraulic pump and a second pump flow rate indicating a flow rate of the operating oil discharged from the second hydraulic pump in a splitting state in which a passage that connects the first hydraulic pump and the second hydraulic pump is closed by an opening and closing device based on the cylinder pressure data and the operation amount data; and controlling the first hydraulic pump and the second hydraulic pump based on the first pump flow rate and the second pump flow rate.

Advantageous Effects of Invention

According to the aspects of the present invention, a control system, a work machine, and a control method capable of controlling a working unit at a sufficient speed and responsiveness are provided.

DESCRIPTION OF EMBODIMENTS

While embodiments of the present invention will be described with reference to the drawings, the present invention is not limited to these embodiments. The constituent elements of respective embodiments described later can be appropriately combined with each other. Moreover, some of the constituent elements may not be used.

First Embodiment

[Work Machine]

Figure 1:
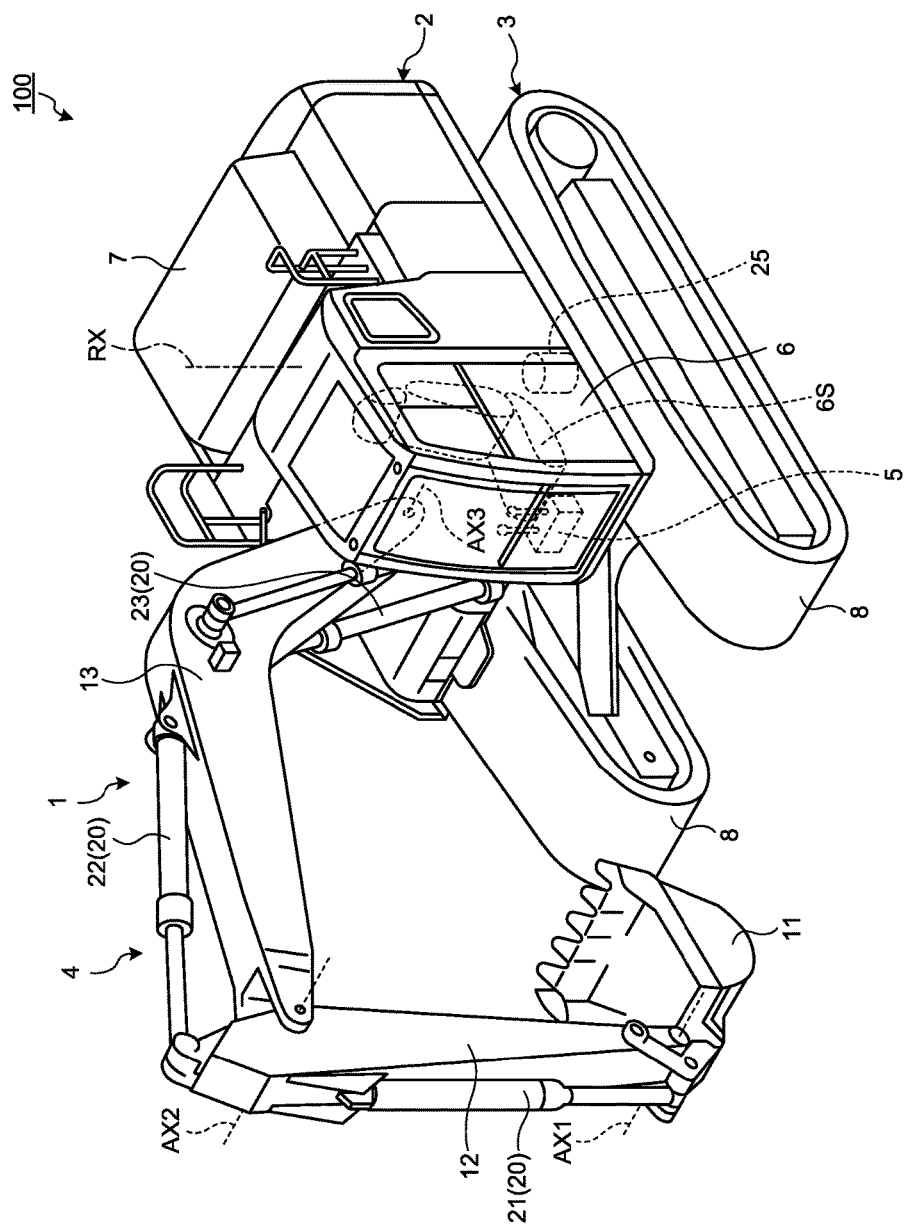
FIG. 1 is a perspective view illustrating an example of a work machine according to a first embodiment.

FIG. 1 is a perspective view illustrating an example of a work machine 100 according to the embodiment. In the embodiment, an example in which the work machine 100 is a hybrid excavator will be described. In the following description, the work machine 100 is appropriately referred to as an excavator 100.

As illustrated in FIG. 1, the excavator 100 includes a working unit 1 that operates with hydraulic pressure, an upper swing structure 2 which is a swing structure that supports the working unit 1, a lower traveling structure 3 that supports the upper swing structure 2, a driving device 4 that drives the excavator 100, and an operating device 5 for operating the working unit 1.

The upper swing structure 2 can swing about the swing axis RX. The upper swing structure 2 has a cab 6 on which an operator boards and a machine room 7. A driver's seat 6S on which the operator sits is provided in the cab 6. The machine room 7 is disposed on a rear side of the cab 6. At least a portion of the driving device 4 including an engine, a hydraulic pump, and the like is disposed in the machine room 7. The lower traveling structure 3 has a pair of crawlers 8. The excavator 100 travels when the crawler 8 rotates. The lower traveling structure 3 may be wheels (tires).

The working unit 1 is supported on the upper swing structure 2. The working unit 1 includes a bucket 11, an arm 12 connected to the bucket 11, and a boom 13 connected to the arm 12. The bucket 11 and the arm 12 are connected by a bucket pin. The bucket 11 is supported on the arm 12 so as to be rotatable about a rotation axis AX1. The arm 12 and the boom 13 are connected by an arm pin. The arm 12 is supported on the boom 13 so as to be rotatable about a rotation axis AX2. The boom 13 and the upper swing structure 2 are connected by a boom pin. The boom 13 is supported on the upper swing structure 2 so as to be rotatable about a rotation axis AX3. The upper swing structure 2 is supported on the lower traveling structure 3 so as to be rotatable about a swing axis RX.

The rotation axis AX1, the rotation axis AX2, and the rotation axis AX3 are parallel to each other. The rotation axes AX1, AX2, and AX3 is orthogonal to an axis parallel to the swing axis RX. In the following description, a direction parallel to the rotation axes AX1, AX2, and AX3 will be appropriately referred to as a vehicle width direction of the upper swing structure 2, a direction parallel to the swing axis RX will be appropriately referred to as an up-down direction of the upper swing structure 2, and a direction orthogonal to both the rotation axes AX1, AX2, and AX3 and the swing axis RX will be appropriately referred to as a front-rear direction of the upper swing structure 2. A direction in which the working unit 1 is present about the swing axis RX is the front side. A direction in which the machine room 7 is present about the swing axis RX is the rear side.

The driving device 4 has a hydraulic cylinder 20 that drives the working unit 1 and an electric swing motor 25 that generates power for swinging the upper swing structure 2. The hydraulic cylinder 20 is driven with operating oil. The hydraulic cylinder 20 includes a bucket cylinder 21 that drives the bucket 11, an arm cylinder 22 that drives the arm 12, and a boom cylinder 23 that drives the boom 13. The upper swing structure 2 can swing about the swing axis RX with the power generated by the electric swing motor 25 in a state of being supported on the lower traveling structure 3.

The operating device 5 is disposed in the cab 6. The operating device 5 is operated by the operator of the excavator 100. The operating device 5 is operated to drive the hydraulic cylinder 20. The operating device 5 includes an operating lever. When the operating device 5 is operated, the hydraulic cylinder 20 is driven and the working unit 1 is driven.

[Control System]

Figure 2:
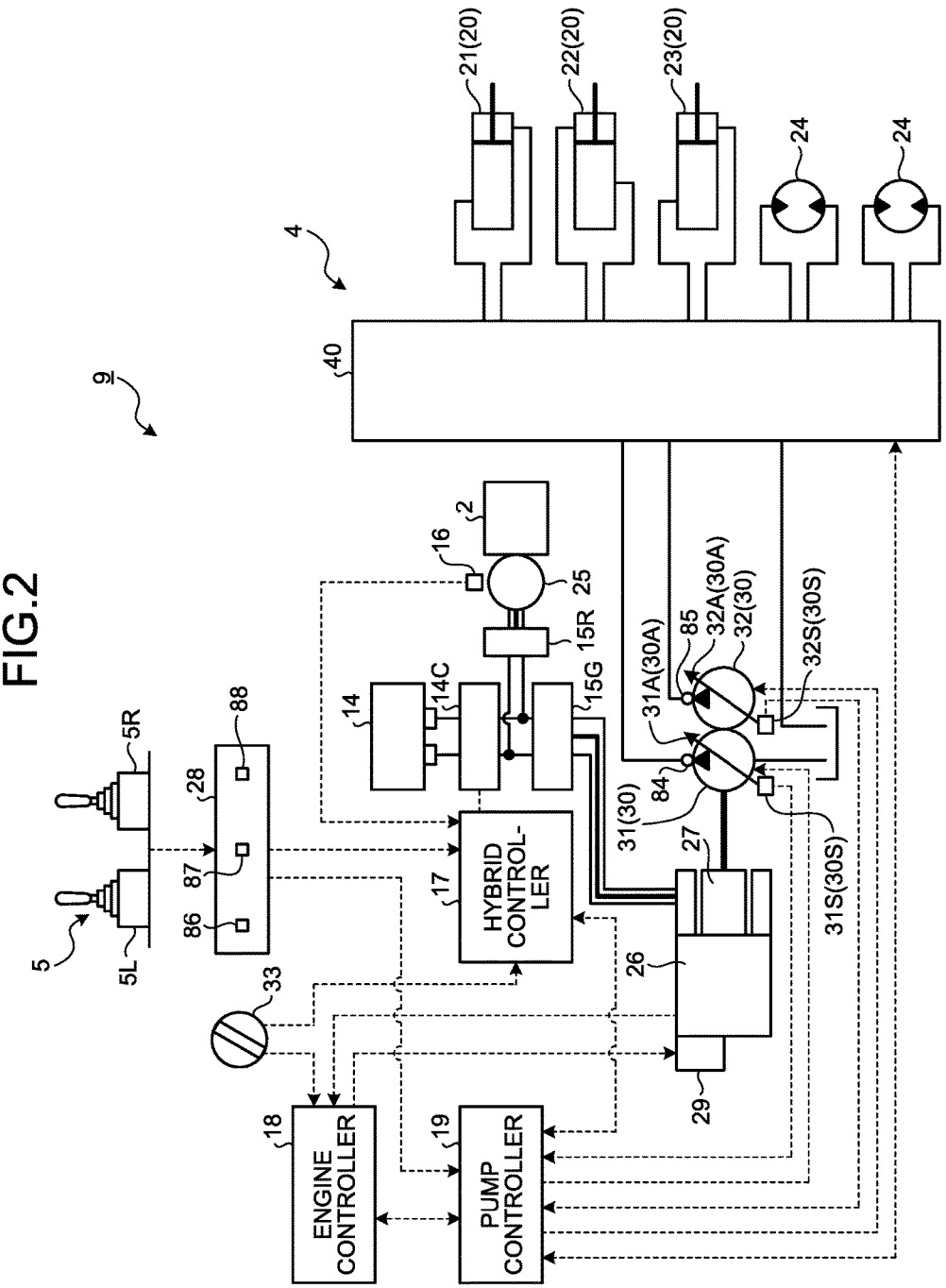
FIG. 2 is a diagram schematically illustrating an example of a control system of a work machine according to the first embodiment.

FIG. 2 is a diagram schematically illustrating a control system 9 of the excavator 100 according to the embodiment. The control system 9 includes the driving device 4. The control system 9 controls the excavator 100 including the working unit 1 and a plurality of hydraulic cylinders 20 for driving the working unit 1.

The driving device 4 has an engine 26 which is a drive source, a generator motor 27, and a hydraulic pump 30 that discharges operating oil. The engine 26 is a diesel engine, for example. The generator motor 27 is a switched reluctance motor, for example. The generator motor 27 may be a permanent magnet (PM) motor. The hydraulic pump 30 is a variable displacement hydraulic pump. In the embodiment, the hydraulic pump 30 is a swash plate-type hydraulic pump. The hydraulic pump 30 includes a first hydraulic pump 31 and a second hydraulic pump 32. An output shaft of the engine 26 is mechanically coupled to the generator motor 27 and the hydraulic pump 30. The generator motor 27 and the hydraulic pump 30 operate when the engine 26 is driven. The generator motor 27 may be mechanically connected directly to the output shaft of the engine 26 and may be connected to the output shaft of the engine 26 by a power transmission mechanism such as power take-off (PTO).

The driving device 4 includes a hydraulic drive system and an electric drive system. The hydraulic drive system has the hydraulic pump 30, a hydraulic circuit 40 in which the operating oil discharged from the hydraulic pump 30 flows, the hydraulic cylinder 20 that operates with the operating oil supplied via the hydraulic circuit 40, and a traveling motor 24. The traveling motor 24 is a hydraulic motor driven with the operating oil discharged from the hydraulic pump 30, for example.

The electric drive system has the generator motor 27, a storage battery 14, a transformer 14C, a first inverter 15G, a second inverter 15R, and the electric swing motor 25. When the engine 26 is driven, a rotor shaft of the generator motor 27 rotates. In this way, the generator motor 27 can generate electricity. The storage battery 14 is an electric double-layer storage battery, for example.

A hybrid controller 17 allows DC electric power to be exchanged between the transformer 14C and the first and second inverters 15G and 15R. Moreover, the hybrid controller 17 allows DC electric power to be exchanged between the transformer 14C and the storage battery 14. The electric swing motor 25 operates based on the electric power supplied from the generator motor 27 or the storage battery 14 and generates power for swinging the upper swing structure 2. The electric swing motor 25 is an embedded magnet synchronous electric swing motor, for example. A rotation sensor 16 is provided in the electric swing motor 25. The rotation sensor 16 is a resolver or a rotary encoder, for example. The rotation sensor 16 detects a rotation angle or a rotation speed of the electric swing motor 25.

In the embodiment, the electric swing motor 25 generates regeneration energy during deceleration. The storage battery 14 is charged by the regeneration energy (electric energy) generated by the electric swing motor 25. The storage battery 14 may be an electric double-layer storage battery and may be a secondary battery such as a nickel-metal hydride battery or a lithium ion battery.

The driving device 4 operates based on an operation of the operating device 5 provided in the cab 6. An operation amount of the operating device 5 is detected by an operation amount detection unit 28. The operation amount detection unit 28 includes a pressure sensor. Pilot pressure generated according to the operation amount of the operating device 5 is detected by the operation amount detection unit 28. The operation amount detection unit 28 converts a detection signal of the pressure sensor to an operation amount of the operating device 5. The operation amount detection unit 28 may include an electric sensor like a potentiometer. When the operating device 5 includes an electric lever, an electric signal generated according to the operation amount of the operating device 5 is detected by the operation amount detection unit 28.

A throttle dial 33 is provided in the cab 6. The throttle dial 33 is an operating unit for setting the amount of fuel supplied to the engine 26.

The control system 9 includes the hybrid controller 17, an engine controller 18 that controls the engine 26, and a pump controller 19 that controls the hydraulic pump 30. The hybrid controller 17, the engine controller 18, and the pump controller 19 each include a computer system. The hybrid controller 17, the engine controller 18, and the pump controller 19 each include a processor such as a central processing unit (CPU), a storage device such as read only memory (ROM) or random access memory (RAM), and an input and output interface. The hybrid controller 17, the engine controller 18, and the pump controller 19 may be integrated into one controller.

The hybrid controller 17 adjusts the temperature of the generator motor 27, the electric swing motor 25, the storage battery 14, the first inverter 15G, and the second inverter 15R based on the detection signals of temperature sensors provided in the generator motor 27, the electric swing motor 25, the storage battery 14, the first inverter 15G, and the second inverter 15R. The hybrid controller 17 performs charge/discharge control of the storage battery 14, power generation control of the generator motor 27, and the assist control of the engine 26 by the generator motor 27. The hybrid controller 17 controls the electric swing motor 25 based on the detection signal of the rotation sensor 16.

The engine controller 18 generates a command signal based on the setting value of the throttle dial 33 and outputs the command signal to a common rail control unit 29 provided in the engine 26. The common rail control unit 29 adjusts the amount of fuel injected to the engine 26 based on the command signal transmitted from the engine controller 18.

The pump controller 19 generates a command signal for adjusting the flow rate of the operating oil discharged from the hydraulic pump 30 based on the command signal transmitted from at least one of the engine controller 18, the hybrid controller 17, and the operation amount detection unit 28. In the present embodiment, the hydraulic pump 30 includes the first hydraulic pump 31 and the second hydraulic pump 32. The first hydraulic pump 31 and the second hydraulic pump 32 are driven by the engine 26. The first hydraulic pump 31 and the second hydraulic pump 32 discharge operating oil to be supplied to the hydraulic cylinder 20.

The pump controller 19 controls an inclination angle of a swash plate 30A of the hydraulic pump 30 to adjusts the flow rate of the operating oil discharged from the hydraulic pump 30. A swash plate angle sensor 30S that detects a swash plate angle of the hydraulic pump 30 is provided in the hydraulic pump 30. The swash plate angle sensor 30S includes a swash plate angle sensor 31S that detects an inclination angle of a swash plate 31A of the first hydraulic pump 31 and a swash plate angle sensor 32S that detects an inclination angle of a swash plate 32A of the second hydraulic pump 32. The detection signal of the swash plate angle sensor 30S is output to the pump controller 19.

The pump controller 19 calculates a pump capacity (cc/rev) of the hydraulic pump 30 based on the detection signal of the swash plate angle sensor 30S. A servo mechanism that drives the swash plate 30A is provided in the hydraulic pump 30. The pump controller 19 controls the servo mechanism to adjust the swash plate angle. A pressure sensor 84 and a pressure sensor 85 for detecting the pressure of the operating oil discharged from the hydraulic pump 30 are provided in the hydraulic circuit 40. The detection signals of the pressure sensor 84 and the pressure sensor 85 are output to the pump controller 19. In the embodiment, the engine controller 18 and the pump controller 19 are connected to an in-vehicle local area network (LAN) like a controller area network (CAN). With the in-vehicle LAN, the engine controller 18 and the pump controller 19 can exchange data. The pump controller 19 acquires detection values of the respective sensors provided in the hydraulic circuit 40 and outputs a control command for controlling the hydraulic pump 30 and the like. The details of the control executed by the pump controller 19 will be described later.

[Hydraulic Circuit]

Figure 3:
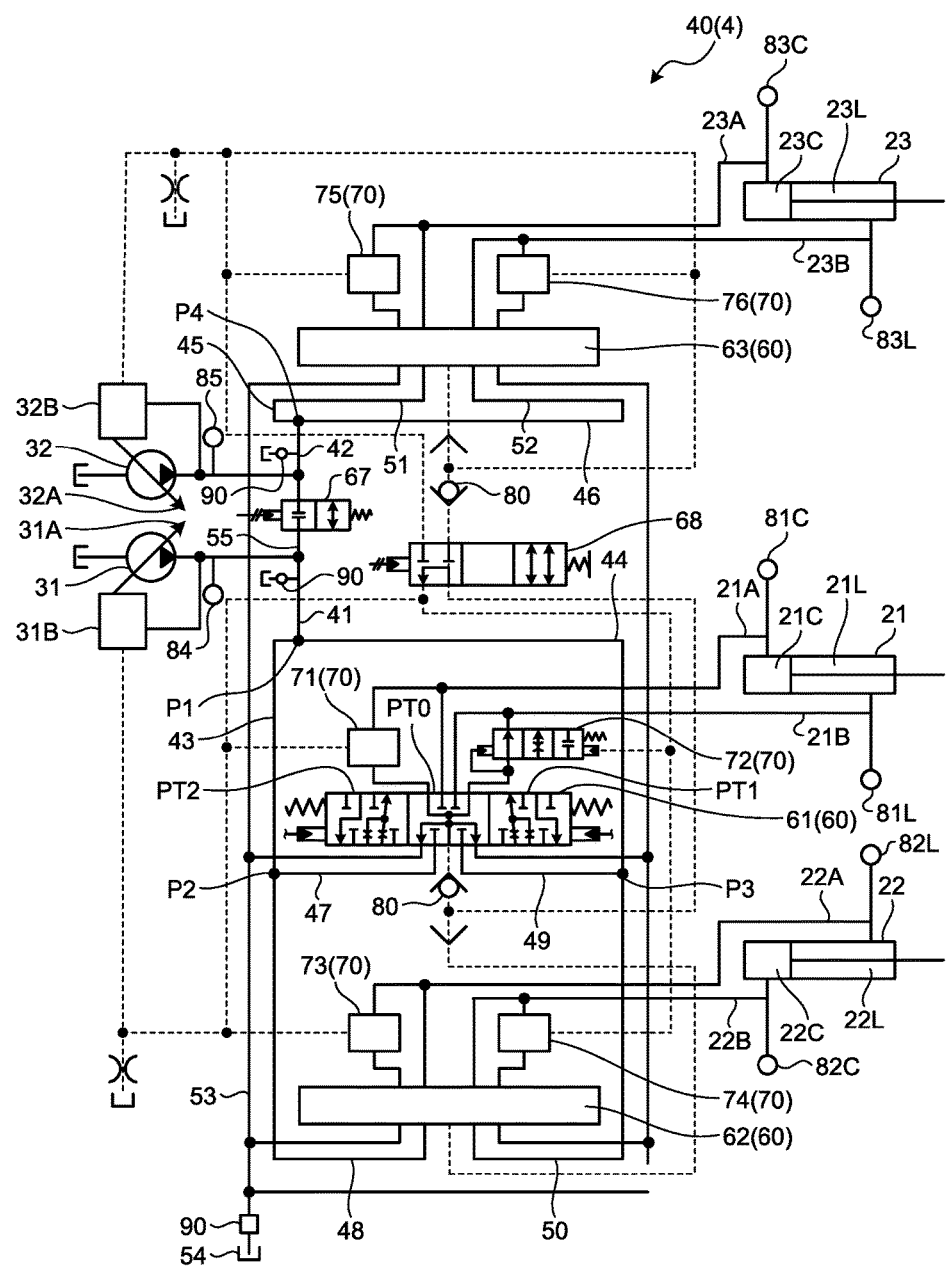
FIG. 3 is a diagram illustrating an example of a hydraulic circuit of the work machine according to the first embodiment.

FIG. 3 is a diagram illustrating an example of the hydraulic circuit 40 of the driving device 4 according to the embodiment. The driving device 4 includes the bucket cylinder 21, the arm cylinder 22, the boom cylinder 23, the first hydraulic pump 31 that discharges operating oil to be supplied to the bucket cylinder 21 and the arm cylinder 22, and a second hydraulic pump 32 that discharges operating oil to be supplied to the boom cylinder 23. The operating oil discharged from the first hydraulic pump 31 and the second hydraulic pump 32 flows into the hydraulic circuit 40.

The hydraulic circuit 40 includes a first pump passage 41 connected to the first hydraulic pump 31 and a second pump passage 42 connected to the second hydraulic pump 32. The hydraulic circuit 40 includes a first supply passage 43 and a second supply passage 44 connected to the first pump passage 41 and a third supply passage 45 and a fourth supply passage 46 connected to the second pump passage 42.

The first pump passage 41 branches into the first supply passage 43 and the second supply passage 44 in a first branch portion P1. The second pump passage 42 branches into the third supply passage 45 and the fourth supply passage 46 in a fourth branch portion P4.

The hydraulic circuit 40 includes a first branch passage 47 and a second branch passage 48 connected to the first supply passage 43 and a third branch passage 49 and a fourth branch passage 50 connected to the second supply passage 44. The first supply passage 43 branches into the first branch passage 47 and the second branch passage 48 in a second branch portion P2. The second supply passage 44 branches into the third branch passage 49 and the fourth branch passage 50 in a third branch portion P3. The hydraulic circuit 40 includes a fifth branch passage 51 connected to the third supply passage 45 and a sixth branch passage 52 connected to the fourth supply passage 46.

The hydraulic circuit 40 includes a main operating valve 60 that adjusts the direction and the flow rate of the operating oil supplied to the hydraulic cylinder 20 based on the pilot pressure generated when the operating device 5 is operated. The main operating valve 60 includes a first main operating valve 61 that adjusts the direction and the flow rate of the operating oil supplied to the bucket cylinder 21, a second main operating valve 62 that adjusts the direction and the flow rate of the operating oil supplied to the arm cylinder 22, and a third main operating valve 63 that adjusts the direction and the flow rate of the operating oil supplied to the boom cylinder 23.

The first main operating valve 61 is connected to the first branch passage 47 and the third branch passage 49. The second main operating valve 62 is connected to the second branch passage 48 and the fourth branch passage 50. The third main operating valve 63 is connected to the fifth branch passage 51 and the sixth branch passage 52.

The hydraulic circuit 40 includes a first bucket passage 21A that connects the first main operating valve 61 and a cap-side space 21C of the bucket cylinder 21 and a second bucket passage 21B that connects the first main operating valve 61 and a rod-side space 21L of the bucket cylinder 21.

The hydraulic circuit 40 includes a first arm passage 22A that connects the second main operating valve 62 and a rod-side space 22L of the arm cylinder 22 and a second arm passage 22B that connects the second main operating valve 62 and a cap-side space 22C of the arm cylinder 22.

The hydraulic circuit 40 includes a first boom passage 23A that connects the third main operating valve 63 and a cap-side space 23C of the boom cylinder 23 and a second boom passage 23B that connects the third main operating valve 63 and a rod-side space 23L of the boom cylinder 23.

The cap-side space of the hydraulic cylinder 20 is a space between a cylinder head cover and a piston. The rod-side space of the hydraulic cylinder 20 is a space in which a piston rod is disposed.

When operating oil is supplied to the cap-side space 21C of the bucket cylinder 21 and the bucket cylinder 21 is extended, the bucket 11 performs an excavation operation. When operating oil is supplied to the rod-side space 21L of the bucket cylinder 21 and the bucket cylinder 21 is retracted, the bucket 11 performs a dumping operation.

When operating oil is supplied to the cap-side space 22C of the arm cylinder 22 and the arm cylinder 22 is extended, the arm 12 performs an excavation operation. When operating oil is supplied to the rod-side space 22L of the arm cylinder 22 and the arm cylinder 22 is retracted, the arm 12 performs a dumping operation.

When operating oil is supplied to the cap-side space 23C of the boom cylinder 23 and the boom cylinder 23 is extended, the boom 13 performs a raising operation. When operating oil is supplied to the rod-side space 23L of the boom cylinder 23 and the boom cylinder 23 is retracted, the boom 13 performs a lowering operation.

The working unit 1 operates with an operation of the operating device 5. In the embodiment, the operating device 5 includes a right operating lever 5R disposed on the right side of the operator sitting on the driver's seat 6S and a left operating lever 5L disposed on the left side. When the right operating lever 5R is operated in a front-rear direction, the boom 13 performs a lowering operation or a raising operation. When the right operating lever 5R is operated in a left-right direction (the vehicle width direction), the bucket 11 performs an excavation operation or a dumping operation. When the left operating lever 5L, is operated in a front-rear direction, the arm 12 performs a dumping operation or an excavation operation. When the left operating lever 5L is operated in a left-right direction, the upper swing structure 2 swings toward the left side or the right side. The upper swing structure 2 may swing toward the right side or the left side when the left operating lever 5L is operated in the front-rear direction and the arm 12 may perform a dumping operation or an excavation operation when the left operating lever 5L is operated in the left-right direction.

The swash plate 31A of the first hydraulic pump 31 is driven by a servo mechanism 31B. The servo mechanism 31B operates based on the command signal from the pump controller 19 to adjust the inclination angle of the swash plate 31A of the first hydraulic pump 31. When the inclination angle of the swash plate 31A of the first hydraulic pump 31 is adjusted, the pump capacity (cc/rev) of the first hydraulic pump 31 is adjusted. Similarly, the swash plate 32A of the second hydraulic pump 32 is driven by a servo mechanism 32B. When the inclination angle of the swash plate 32A of the second hydraulic pump 32 is adjusted, the pump capacity (cc/rev) of the second hydraulic pump 32 is adjusted.

The first main operating valve 61 is a direction control valve that adjusts the direction and the flow rate of the operating oil supplied from the first hydraulic pump 31 to the bucket cylinder 21. The second main operating valve 62 is a direction control valve that adjusts the direction and the flow rate of the operating oil supplied from the first hydraulic pump 31 to the arm cylinder 22. The third main operating valve 63 is a direction control valve that adjusts the direction and the flow rate of the operating oil supplied from the second hydraulic pump 32 to the boom cylinder 23.

The first main operating valve 61 is a slide spool-type direction control valve. The spool of the first main operating valve 61 can move between a stop position PT0 at which the supply of operating oil to the bucket cylinder 21 is stopped to stop the bucket cylinder 21, a first position PT1 at which the first branch passage 47 and the first bucket passage 21A are connected so that operating oil is supplied to the cap-side space 21C to extend the bucket cylinder 21, and a second position PT2 at which the third branch passage 49 and the second bucket passage 21B are connected so that operating oil is supplied to the rod-side space 21l, to retract the bucket cylinder 21. The first main operating valve 61 is operated so that the bucket cylinder 21 enters into at least one of the stopped state, the extended state, and the retracted state.

The second main operating valve 62 has a structure equivalent to that of the first main operating valve 61. The spool of the second main operating valve 62 can move between a stop position PT0 at which the supply of operating oil to the arm cylinder 22 is stopped to stop the arm cylinder 22, a second position PT2 at which the fourth branch passage 50 and the second arm passage 22B are connected so that operating oil is supplied to the cap-side space 22C to extend the arm cylinder 22, and a first position PT1 at which the second branch passage 48 and the first arm passage 22A are connected so that operating oil is supplied to the rod-side space 22L to retract the arm cylinder 22. The second main operating valve 62 is operated so that the arm cylinder 22 enters into at least one of the stopped state, the extended state, and the retracted state.

The third main operating valve 63 has a structure equivalent to that of the first main operating valve 61. The spool of the third main operating valve 63 can move between a stop position PT0 at which the supply of operating oil to the boom cylinder 23 is stopped to stop the boom cylinder 23, a first position PT1 at which the fifth branch passage 51 and the first boom passage 23A are connected so that operating oil is supplied to the cap-side space 23C to extend the boom cylinder 23, and a second position PT2 at which the sixth branch passage 52 and the second boom passage 23B are connected so that operating oil is supplied to the rod-side space 23L to retract the boom cylinder 23. The third main operating valve 63 is operated so that the boom cylinder 23 enters into at least one of the stopped state, the extended state, and the retracted state.

The first main operating valve 61 is operated by the operating device 5. When the operating device 5 is operated, the pilot pressure acts on the first main operating valve 61, and the direction and the flow rate of the operating oil supplied from the first main operating valve 61 to the bucket cylinder 21 are determined. In the present embodiment, the operating device 5 includes a pilot pressure-type operating lever. Pilot pressure is generated when the operating device 5 is operated. When pilot pressure acts on the first main operating valve 61, the spool of the first main operating valve 61 moves by the distance corresponding to the pilot pressure. The first main operating valve 61 moves the spool based on the pilot pressure generated when the operating device 5 is operated and adjusts the direction and the flow rate of the operating oil supplied to the bucket cylinder 21. The bucket cylinder 21 moves in a moving direction corresponding to the direction of the operating oil supplied to the bucket cylinder 21, and the bucket cylinder 21 moves at a cylinder speed corresponding to the flow rate of the operating oil supplied to the bucket cylinder 21.

Similarly, the second main operating valve 62 is operated by the operating device 5. When the operating device 5 is operated, the pilot pressure acts on the second main operating valve 62 and the direction and the flow rate of the operating oil supplied from the second main operating valve 62 to the arm cylinder 22 are determined. The second main operating valve 62 moves the spool based on the pilot pressure generated when the operating device 5 is generated and adjusts the direction and the flow rate of the operating oil supplied to the arm cylinder 22. The arm cylinder 22 operates in a moving direction corresponding to the direction of the operating oil supplied to the arm cylinder 22 and the arm cylinder 22 operates at a cylinder speed corresponding to the flow rate of the operating oil supplied to the arm cylinder 22.

Similarly, the third main operating valve 63 is operated by the operating device 5. When the operating device 5 is operated, the pilot pressure acts on the third main operating valve 63, and the direction and the flow rate of the operating oil supplied from the third main operating valve 63 to the boom cylinder 23 are determined. The third main operating valve 63 moves the spool based on the pilot pressure generated when the operating device 5 is operated and adjusts the direction and the flow rate of the operating oil supplied to the boom cylinder 23. The boom cylinder 23 operates in a moving direction corresponding to the direction of the operating oil supplied to the boom cylinder 23, and the boom cylinder 23 operates at a cylinder speed corresponding to the flow rate of the operating oil supplied to the boom cylinder 23.

The operation amount detection unit 28 includes a pressure sensor 86 that detects the pilot pressure for operating the first main operating valve 61, a pressure sensor 87 that detects the pilot pressure for operating the second main operating valve 62, and a pressure sensor 88 that detects the pilot pressure for operating the third main operating valve 63.

The operation amount detection unit 28 calculates the operation amount of the operating device 5 for driving the bucket cylinder 21 based on the detection signal of the pressure sensor 86. The value of the detection signal of the pressure sensor 86 is correlated with the operation amount of the operating device 5. Correlation data indicating the relation between the value of the detection signal of the pressure sensor 86 and the operation amount of the operating device 5 is stored in the operation amount detection unit 28. The operation amount detection unit 28 calculates the operation amount of the operating device 5 for driving the bucket cylinder 21 based on the detection signal of the pressure sensor 86 and the correlation data.

Similarly, the operation amount detection unit 28 calculates the operation amount of the operating device 5 for driving the arm cylinder 22 based on the detection signal of the pressure sensor 87.

Similarly, the operation amount detection unit 28 calculates the operation amount of the operating device 5 for driving the boom cylinder 23 based on the detection signal of the pressure sensor 88.

When the bucket cylinder 21 operates, the bucket 11 is driven based on the moving direction and the cylinder speed of the bucket cylinder 21. When the arm cylinder 22 operates, the arm 12 is driven based on the moving direction and the cylinder speed of the arm cylinder 22. When the boom cylinder 23 operates, the boom 13 is driven based on the moving direction and the cylinder speed of the boom cylinder 23.

The operating oils discharged from the bucket cylinder 21, the arm cylinder 22, and the boom cylinder 23 are discharged to a tank 54 via a discharge passage 53.

In the present embodiment, a relief valve 90 that prevent an increase in the pressure of the operating oil of the hydraulic circuit 40 is provided in the discharge passage 53. When the pressure of the operating oil of the hydraulic circuit 40 is higher than a specified value, the relief valve 90 operates and the operating oil is discharged from the hydraulic circuit 40 via the relief valve 90.

The first pump passage 41 and the second pump passage 42 are connected by a merging passage 55. The merging passage 55 is a passage that connects the first hydraulic pump 31 and the second hydraulic pump 32. The merging passage 55 connects the first hydraulic pump 31 and the second hydraulic pump 32 via the first pump passage 41 and the second pump passage 42.

The hydraulic circuit 40 includes a first merging and splitting valve 67. The first merging and splitting valve 67 is provided in the merging passage 55. The first merging and splitting valve 67 is an opening and closing device that opens and closes the merging passage 55. The first merging and splitting valve 67 is controlled by the pump controller 19.

The first merging and splitting valve 67 opens and closes the merging passage 55 to switch between a merging state in which the first pump passage 41 and the second pump passage 42 are connected and a splitting state in which the first pump passage 41 and the second pump passage 42 are split. The merging state includes a state in which the merging passage 55 is open by the first merging and splitting valve 67. The splitting state includes a state in which the merging passage 55 is closed by the first merging and splitting valve 67.

The merging state means a state in which the first pump passage 41 and the second pump passage 42 are connected by the merging passage 55 and the operating oil discharged from the first pump passage 41 and the operating oil discharged from the second pump passage 42 merge together in the first merging and splitting valve 67. In the merging state, the operating oil discharged from the first hydraulic pump 31 and the operating oil discharged from the second hydraulic pump 32 are supplied to the bucket cylinder 21, the arm cylinder 22, and the boom cylinder 23.

The splitting state means a state in which the merging passage 55 that connects the first pump passage 41 and the second pump passage 42 is split by the first merging and splitting valve 67 and the operating oil discharged from the first pump passage 41 and the operating oil discharged from the second pump passage 42 are split. In the splitting state, the operating oil discharged from the first hydraulic pump 31 is supplied to the bucket cylinder 21 and the arm cylinder 22 and is not supplied to the boom cylinder 23. Moreover, in the splitting state, the operating oil discharged from the second hydraulic pump 32 is supplied to the boom cylinder 23 and is not supplied to the bucket cylinder 21 and the arm cylinder 22.

The spool of the first merging and splitting valve 67 can move between a merging position at which the merging passage 55 is open to connect the first pump passage 41 and the second pump passage 42 and a splitting position at which the merging passage 55 is closed to split the first pump passage 41 and the second pump passage 42. The first merging and splitting valve 67 is controlled so that the first pump passage 41 and the second pump passage 42 enter into at least one of the merging state and the splitting state.

When the first merging and splitting valve 67 is closed, the merging passage 55 is closed. In a splitting state in which the merging passage 55 is closed, the first hydraulic pump 31 discharges the operating oil to be supplied to a first hydraulic cylinder group including at least one hydraulic cylinder 20. Moreover, in a splitting state in which the merging passage 55 is closed, the second hydraulic pump 32 discharges operating oil to be supplied to a second hydraulic cylinder group including at least one hydraulic cylinder 20 different from the hydraulic cylinder 20 belonging to the first hydraulic cylinder group. In the present embodiment, the first hydraulic cylinder group includes the bucket cylinder 21 and the arm cylinder 22. The second hydraulic cylinder group includes the boom cylinder 23.

In the splitting state in which the merging passage 55 is closed, the operating oil discharged from the first hydraulic pump 31 is supplied to the bucket cylinder 21 and the arm cylinder 22 via the first pump passage 41, the first main operating valve 61, and the second main operating valve 62. Moreover, in the splitting state in which the merging passage 55 is closed, the operating oil discharged from the second hydraulic pump 32 is supplied to the boom cylinder 23 via the second pump passage 42 and the third main operating valve 63.

In the merging state in which the merging passage 55 is open, the operating oil discharged from the first hydraulic pump 31 and the second hydraulic pump 32 is supplied to the bucket cylinder 21, the arm cylinder 22, and the boom cylinder 23 via the first pump passage 41, the second pump passage 42, the first main operating valve 61, the second main operating valve 62, and the third main operating valve 63.

The hydraulic circuit 40 includes a second merging and splitting valve 68. The second merging and splitting valve 68 is connected to a shuttle valve 80 provided between the first main operating valve 61 and the second main operating valve 62. The largest pressure of the first main operating valve 61 and the second main operating valve 62 is selected by the shuttle valve 80 and is output to the second merging and splitting valve 68. Moreover, the shuttle valve 80 is connected between the second merging and splitting valve 68 and the third main operating valve 63.

The second merging and splitting valve 68 selects a largest pressure of the load sensing pressure (LS pressure), at which the operating oil supplied to the respective shafts of the bucket cylinder 21 (first shaft), the arm cylinder 22 (second shaft), and the boom cylinder 23 (third shaft) is decompressed, with the aid of the shuttle valve 80. The load sensing pressure is a pilot pressure used for pressure compensation. When the second merging and splitting valve 68 is in the merging state, the largest LS pressure of the first to third shafts is selected and the selected largest LS pressure is supplied to a pressure compensation valve 70, the servo mechanism 31B of the first hydraulic pump 31, and the servo mechanism 32B of the second hydraulic pump 32 of each of the first to third shafts. On the other hand, when the second merging and splitting valve 68 is in the splitting state, the largest LS pressure of the first and second shafts is supplied to the pressure compensation valve 70 and the servo mechanism 31B of the first hydraulic pump 31 of each of the first and second shafts and the LS pressure of the third shaft is supplied to the pressure compensation valve 70 and the servo mechanism 32B of the second hydraulic pump 32 of the third shaft.

The shuttle valve 80 selects a pilot pressure having the largest value among the pilot pressures output from the first main operating valve 61, the second main operating valve 62, and the third main operating valve 63. The selected pilot pressure is supplied to the pressure compensation valve 70 and the servo mechanism (31B, 32B) of the hydraulic pump 30 (31, 32).

[Pressure Sensor]

A pressure sensor 81O is attached to the first bucket passage 21A. A pressure sensor 81L is attached to the second bucket passage 21S. The pressure sensor 81O detects the pressure inside the cap-side space 21O of the bucket cylinder 21. The pressure sensor 81L detects the pressure inside the rod-side space 21L of the bucket cylinder 21.

A pressure sensor 82O is attached to the first arm passage 22A. A pressure sensor 82L is attached to the second arm passage 22B. The pressure sensor 82C detects the pressure inside the cap-side space 22C of the arm cylinder 22. The pressure sensor 82I, detects the pressure inside the rod-side space 22L of the arm cylinder 22.

A pressure sensor 83C is attached to the first boom passage 23A. A pressure sensor 83L is attached to the second boom passage 23B. The pressure sensor 83C detects the pressure inside the cap-side space 23C of the boom cylinder 23. The pressure sensor 83L detects the pressure inside the rod-side space 21L of the boom cylinder 23.

The pressure sensor 84 is provided in a discharge port of the first hydraulic pump 31. The pressure sensor 84 is provided between the first hydraulic pump 31 and the first pump passage 41. The pressure sensor 84 detects the pressure of the operating oil discharged from the first hydraulic pump 31. The pressure value detected by the pressure sensor 84 is output to the pump controller 19.

The pressure sensor 85 is provided in a discharge port of the second hydraulic pump 32. The pressure sensor 85 is provided between the second hydraulic pump 32 and the second pump passage 42. The pressure sensor 85 detects the pressure of the operating oil discharged from the second hydraulic pump 32. The pressure value detected by the pressure sensor 85 is output to the pump controller 19.

[Pressure Compensation Valve]

The hydraulic circuit 40 has the pressure compensation valve 70. The pressure compensation valve 70 includes a selection port for selecting a communication state, a throttled state, and a blocked state. The pressure compensation valve 70 includes a throttle valve capable of switching between a blocked state, a throttled state, and a communication state with its own pressure. The pressure compensation valve 70 aims to compensate for flow rate distribution according to the ratio of metering opening areas of respective shafts even when the load pressures of the respective shafts are different. When the pressure compensation valve 70 is not present, a greater part of the operating oil flows into the low load-side shaft. Since the pressure compensation valve 70 allows a pressure loss to act on the shaft having a low load pressure so that the outlet pressure of the main operating valve 60 of the shaft having a low load pressure is equal to the outlet pressure of the main operating valve 60 of the shaft having the largest load pressure, the outlet pressures of the respective main operating valves 60 become the same. Thus, the flow rate distribution function is realized.

The pressure compensation valve 70 includes a pressure compensation valve 71 and a pressure compensation valve 72 connected to the first main operating valve 61, a pressure compensation valve 73 and a pressure compensation valve 74 connected to the second main operating valve 62, and a pressure compensation valve 75 and a pressure compensation valve 76 connected to the third main operating valve 63.

The pressure compensation valve 71 compensates for a front-rear pressure difference (metering pressure difference) of the first main operating valve 61 in a state in which the first branch passage 47 and the first bucket passage 21A are connected so that operating oil is supplied to the cap-side space 21C. The pressure compensation valve 72 compensates for a front-rear pressure difference (metering pressure difference) of the first main operating valve 61 in a state in which the third branch passage 49 and the second bucket passage 21B are connected so that operating oil is supplied to the rod-side space 21L.

The pressure compensation valve 73 compensates for a front-rear pressure difference (metering pressure difference) of the second main operating valve 62 in a state in which the second branch passage 48 and the first arm passage 22A are connected so that operating oil is supplied to the rod-side space 22L. The pressure compensation valve 74 compensates for a front-rear pressure difference (metering pressure difference) of the second main operating valve 62 in a state in which the fourth branch passage 50 and the second arm passage 22B are connected so that operating oil is supplied to the cap-side space 22C.

The front-rear pressure difference (metering pressure difference) of the main operating valve 60 means a difference between the pressure of an inlet port corresponding to the hydraulic pump 30 side of the main operating valve 60 and the pressure of an outlet port corresponding to the hydraulic cylinder 20 side and is a pressure difference for metering the flow rate.

Due to the pressure compensation valve 70, even when a light load acts on one set of hydraulic cylinders 20 of the bucket cylinder 21 and the arm cylinder 22 and a heavy load acts on the other set of hydraulic cylinders 20, the operating oil can be distributed to the bucket cylinder 21 and the arm cylinder 22 with the flow rate corresponding to the operation amount of the operating device 5.

The pressure compensation valve 70 can supply a flow rate based on an operation regardless of the loads of the plurality of hydraulic cylinders 20. For example, when a heavy load acts on the bucket cylinder 21 and a light load acts on the arm cylinder 22, the pressure compensation valve 70 (73, 74) disposed on the light load side compensates for the metering pressure difference $\Delta P2$ on the side of the arm cylinder 22 which is on the light load side so that the metering pressure difference $\Delta P2$ on the side of the arm cylinder 22 which is on the light load side reaches approximately the same pressure as the metering pressure difference $\Delta P1$ on the side of the bucket cylinder 21 and a flow rate based on the operation amount of the second main operating valve 62 is supplied when operating oil is supplied from the first main operating valve 61 to the bucket cylinder 21 and operating oil is supplied from the second main operating valve 62 to the arm cylinder 22 regardless of the generated metering pressure difference ΔP1.

When a heavy load acts on the arm cylinder 22 and a light load acts on the bucket cylinder 21, the pressure compensation valve 70 (71, 72) disposed on the light load side compensates for the metering pressure difference ΔP1 on the light load side so that a flow rate based on the operation amount of the first main operating valve 61 is supplied when operating oil is supplied from the second main operating valve 62 to the arm cylinder 22 and operating oil is supplied from the first main operating valve 61 to the bucket cylinder 21 regardless of the generated metering pressure difference ΔP2.

[Relief Valve]

The hydraulic circuit 40 includes the relief valve 90. In the hydraulic circuit 40, even when the hydraulic cylinder 30 is not driven, operating oil of the flow rate corresponding to the smallest capacity is discharged from the hydraulic pump 30. The discharged operating oil is discharged via the relief valve 90. During the relief, the pump pressure PP is a relieve pressure which is a predetermined value.

[Pump Controller]

Figure 4:
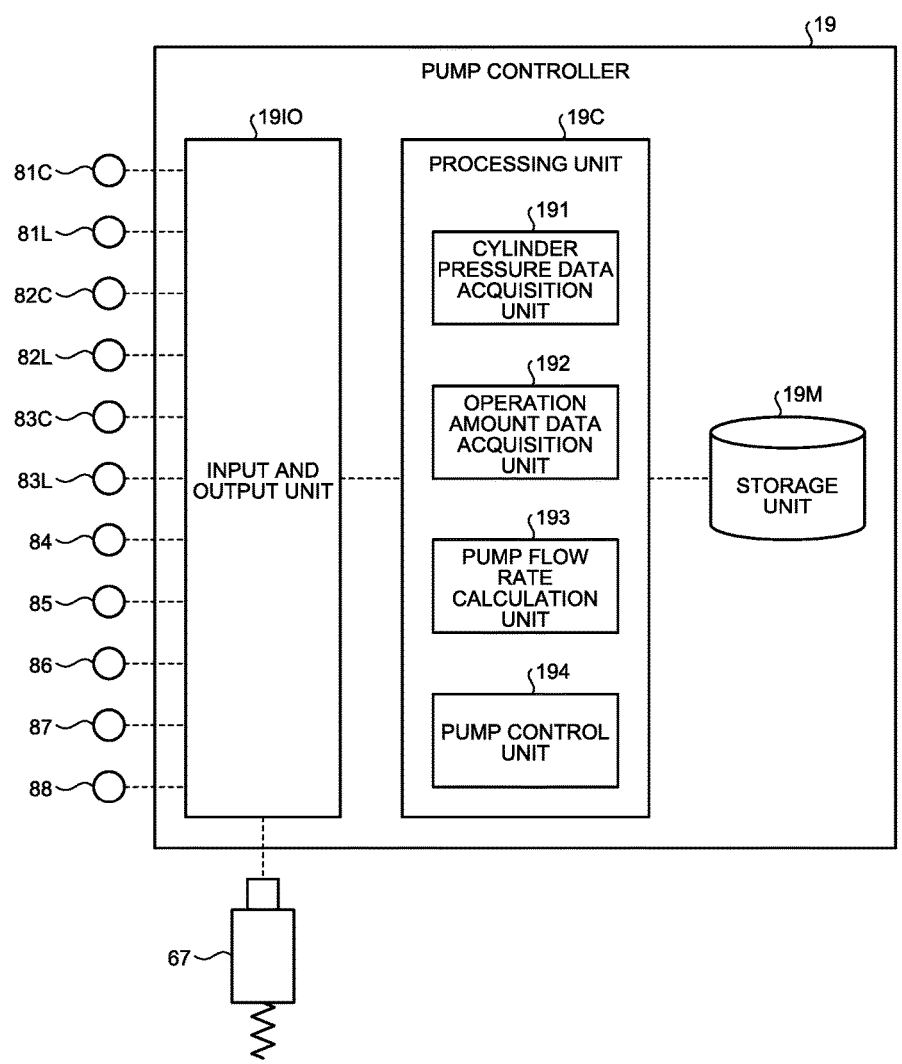
FIG. 4 is a functional block diagram illustrating an example of a pump controller of the work machine according to the first embodiment.

FIG. 4 is a functional block diagram illustrating an example of the pump controller 19 according to the embodiment. The pump controller 19 includes a processing unit 19C, a storage unit 19M, an input and output unit 19IO. The processing unit 19C is a processor, the storage unit 19M is a storage device, and the input and output unit 19IO is an input and output interface device. The storage unit 19M is also used as a temporary storage unit when the processing unit 19C executes processing.

The processing unit 19C includes a cylinder pressure data acquisition unit 191 that acquires cylinder pressure data indicating the pressure of the operating oil of the hydraulic cylinder 20, an operation amount data acquisition unit 192 that acquires operation amount data of the operating device 30, a pump flow rate calculation unit 193 that calculates a first pump flow rate indicating the flow rate of the operating oil discharged from the first hydraulic pump 31 and a second pump flow rate indicating the flow rate of the operating oil discharged from the second hydraulic pump 32 in a splitting state in which the merging passage 55 is closed based on the cylinder pressure data and the operation amount data, and a pump control unit 194 that controls the first hydraulic pump 31 and the second hydraulic pump 32 based on the first pump flow rate and the second pump flow rate.

The pressure sensors 81C, 81L, 82C, 82L, 83C, 83L, 84, 85, 86, 87, and 88 and the first merging and splitting valve 67 are connected to the input and output unit 19IO.

The cylinder pressure data acquisition unit 191 acquires the cylinder pressure data of the bucket cylinder 21 from the pressure sensor 81C and the pressure sensor 81L. The cylinder pressure data acquisition unit 191 acquires the cylinder pressure data of the arm cylinder 22 from the pressure sensor 82C and the pressure sensor 82L. The cylinder pressure data acquisition unit 191 acquires the cylinder pressure data of the boom cylinder 23 from the pressure sensor 83C and the pressure sensor 83L.

The operation amount data acquisition unit 192 acquires operation amount data indicating the operation amount of the operating device 5 operated to drive the bucket cylinder 21. The operation amount data acquisition unit 192 acquires operation amount data indicating the operation amount of the operating device 5 operated to drive the arm cylinder 22. The operation amount data acquisition unit 192 acquires operation amount data indicating the operation amount of the operating device 5 operated to drive the boom cylinder 23. The operation amount data acquisition unit 192 acquires the operation amount data from the operation amount detection unit 28 including the pressure sensors 86, 87, and 88.

The pressure sensor 86 detects the pilot pressure generated when the operating device 5 is operated to operate the first main operating valve 61. The pressure sensor 87 detects the pilot pressure generated when the operating device 5 is operated to operate the second main operating valve 62. The pressure sensor 88 detects the pilot pressure generated when the operating device 5 is operated to operate the third main operating valve 63.

The operation amount detection unit 28 calculates the operation amount data of the operating device 5 for driving the bucket cylinder 21 based on the detection signal of the pressure sensor 86. The value of the detection signal of the pressure sensor 86 is correlated with the operation amount of the operating device 5. Correlation data indicating the relation between the value of the detection signal of the pressure sensor 86 and the operation amount of the operating device 5 is stored in the operation amount detection unit 28. The operation amount detection unit 28 calculates the operation amount data of the operating device 5 for driving the bucket cylinder 21 based on the detection signal of the pressure sensor 86 and the correlation data.

Similarly, the operation amount detection unit 28 calculates the operation amount data of the operating device 5 for driving the arm cylinder 22 based on the detection signal of the pressure sensor 87.

Similarly, the operation amount detection unit 28 calculates the operation amount data of the operating device 5 for driving the boom cylinder 23 based on the detection signal of the pressure sensor 88.

The pump flow rate calculation unit 193 calculates a first pump flow rate indicating the flow rate of the operating oil discharged from the first hydraulic pump 31 and a second pump flow rate indicating the flow rate of the operating oil discharged from the second hydraulic pump 32 in a splitting state in which the merging passage 55 is closed based on the cylinder pressure, data acquired by the cylinder pressure data acquisition unit 191 and the operation amount data acquired by the operation amount data acquisition unit 192.

When ΔPA is a front-rear pressure difference of the main operating valve 60, LA is a cylinder pressure of the hydraulic cylinder 20, PP is a pump pressure indicating the pressure of the operating oil discharged from the hydraulic pump 30, Qd is a required flow rate indicating the flow rate of the operating oil required by the hydraulic cylinder 20 of each axis to be driven based on the operation amount of the operating device 5, and Q is a distribution flow rate of the operating oil distributed to the hydraulic cylinder 20 of each axis, Equation (1) below is satisfied.

$$Q = Qd \times \sqrt{(PP-LA)/\Delta PL} \qquad (1)$$

In the present embodiment, the first main operating valve 61, the second main operating valve 62, and the third main operating valve 63 are set so that a pressure difference between the inlet port and the outlet port is constant. This pressure difference is the set pressure difference ΔPA and is set in advance for each of the first main operating valve 61, the second main operating valve 62, and the third main operating valve 63 and stored in the storage unit 19M of the pump controller 19.

The distribution flow rate Q is calculated for each of the hydraulic cylinders 20 of the respective axes. That is, the distribution flow rate Q is calculated for each of the bucket cylinder 21, the arm cylinder 22, and the boom cylinder 23. When Qbk is the distribution flow rate of the bucket cylinder 21, Qa is the distribution flow rate of the arm cylinder 22, and Qb is the distribution flow rate of the boom cylinder 23, the distribution flow rates Qbk, Qa, and Qb are calculated by Equations (2), (3), and (4).

$$Qbk = Qdbk \times \sqrt{\{(PP - LAbk)/\Delta PL\}} \quad (2)$$

$$Qa = Qda \times \sqrt{\{(PP - LAa)/\Delta PL\}} \quad (3)$$

$$Qb = Qdb \times \sqrt{\{(PP - LAb)/\Delta PL\}} \quad (4)$$

In Equation (2), Qdbk is the required flow rate of the bucket cylinder 21 and LAbk is the load of the bucket cylinder 21. In Equation (3), Qda is the required flow rate of the arm cylinder 22 and LAa is the load of the arm cylinder 22. In Equation (4), Qdb is the required flow rate of the boom cylinder 23 and LAb is the load of the boom cylinder 23. The same value is used as the set pressure difference ΔPL for the first main operating valve 61 that supplies operating oil to the bucket cylinder 21, the second main operating valve 62 that supplies operating oil to the arm cylinder 22, and the third main operating valve 63 that supplies operating oil to the boom cylinder 23. As described above, the load LAbk, the load LAa, and the load LAb may be a constant or 0. In this case, the distribution flow rate Q is determined based on the required flow rate Qd (that is, the operating state of the working unit 5). When the load LAbk, the load LAa, and the load LAb are the actual loads of the bucket cylinder 21, the arm cylinder 22, and the boom cylinder 23, the distribution flow rate Q is determined based on the operating state of the working unit 5 and the load of the hydraulic cylinder 20.

The required flow rate Qd (Qdbk, Qda, Qdb) is uniquely determined from the operation amount data of the operating device 5. That is, the required flow rate Qd is calculated based on the pilot pressures detected by the pressure sensors 86, 87, and 88 included in the operation amount detection unit 28. The pump flow rate calculation unit 193 converts the pilot pressure to a spool stroke of the main operating valve 60 and calculates the required flow rate Qd from the obtained spool stroke. The relation between the pilot pressure and the spool stroke of the main operating valve 60 and the relation between the spool stroke of the main operating valve 60 and the required flow rate Qd are described in a conversion table. The conversion table is stored in the storage unit 19M.

The pump flow rate calculation unit 193 acquires the direction control valve of the pressure sensor 86 that detects the pilot pressure corresponding to the operation of the bucket 11 and converts the direction control valve to a spool stroke of the first main operating valve 61. Moreover, the pump flow rate calculation unit 193 calculates the required flow rate Qdbk of the bucket cylinder 21 from the obtained spool stroke.

The pump flow rate calculation unit 193 acquires the direction control valve of the pressure sensor 87 that detects the pilot pressure corresponding to the operation of the arm 12 and converts the direction control valve to a spool stroke of the second main operating valve 62. Moreover, the pump flow rate calculation unit 193 calculates the required flow rate Qda of the arm cylinder 22 from the obtained spool stroke.

The pump flow rate calculation unit 193 acquires the direction control valve of the pressure sensor 88 that detects the pilot pressure corresponding to the operation of the boom 13 and converts the direction control valve to a spool stroke of the third main operating valve 63. Moreover, the pump flow rate calculation unit 193 calculates the required flow rate Qdb of the boom cylinder 23 from the obtained spool stroke.

The operation directions of the bucket 11, the arm 12, and the boom 13 are different depending on the stroke directions of the first main operating valve 61, the second main operating valve 62, and the third main operating valve 63. The pump flow rate calculation unit 193 selects any one of the pressures of the cap-side spaces 21C, 22C, and 23C and the pressures of the rod-side spaces 21L, 22L, and 23L to be used when calculating the load LA depending on the operation directions of the bucket 11, the arm 12, and the boom 13. For example, when the spool stroke is in the first direction, the pump flow rate calculation unit 193 calculates the loads LAbk, LAa, and LAb using the detection values of the pressure sensors 81C, 82C, and 83C that detect the pressures of the cap-side spaces 21C, 22C, and 23C. When the spool stroke is in a second direction different from the first direction, the pump flow rate calculation unit 193 calculates the loads LAbk, LAa, and LAb using the detection values of the pressure sensors 81L, 82L, and 83L that detect the pressures of the rod-side spaces 21L, 22L, and 23L. In the embodiment, the loads LAbk, LAa, and LAb are the pressure of the bucket cylinder 21, the pressure of the arm cylinder 22, and the pressure of the boom cylinder 23, respectively.

In Equations (1) to (4), when the pressure PP of the operating oil discharged from the hydraulic pump 30 is unknown, the pump flow rate calculation unit 193 executes repeated numerical computations so that Equation (5) below converges, and the pressure PP is calculated based on the distribution flow rates Qbk, Qa, and Qb when Equation (5) converges.

$$Qlp = Qbk + Qa + Qb \quad (5)$$

Qlp is a pump limit flow rate and indicates the flow rate of the operating oil that the hydraulic pump 30 including the first hydraulic pump 31 and the second hydraulic pump 32 can discharge. The pump limit flow rate Qlp is the smallest value among a pump maximum flow rate Qmax and a pump target flow rate Qt determined from the target outputs of the first hydraulic pump 31 and the second hydraulic pump 32. The pump maximum flow rate Qmax is a value obtained by subtracting the flow rate of the operating oil supplied to a hydraulic swing motor when the electric swing motor 25 is replaced with the hydraulic swing motor from the flow rate calculated from the indication value of the throttle dial 33. When the excavator 100 does not have the electric swing motor 25, the pump maximum flow rate Qmax is the flow rate calculated from the indication value of the throttle dial 33.

The target output of the first hydraulic pump 31 and the second hydraulic pump 32 is a value obtained by subtracting the output of an auxiliary machine of the excavator 100 from the target output of the engine 26. The pump target flow rate Qt is the flow rate obtained from the target output and the pump pressure of the first hydraulic pump 31 and the second hydraulic pump 32. Specifically, the pump pressure is the larger one of the pressure of the operating oil discharged from the first hydraulic pump 31 and the pressure of the operating oil discharged from the second hydraulic pump 32.

After the distribution flow rates Qbk, Qa, and Qb are calculated, the pump flow rate calculation unit 193 calculates the first pump flow rate of the first hydraulic pump 31 and the second pump flow rate of the second hydraulic pump 32 based on the distribution flow rates Qbk, Qa, and Qb. That is, in the splitting state in which the merging passage 55 is closed, since the first pump flow rate is determined based on the distribution flow rate Qbk of the operating oil required by the bucket cylinder 21 of the first hydraulic cylinder group the distribution flow rate Qa of the operating oil required by the arm cylinder 22 to be driven based on the operation amount of the operating device 5. Moreover, in the splitting state in which the merging passage 55 is closed, the second pump flow rate is determined based on the distribution flow rate Qb of the operating oil required by the boom cylinder 23 of the second hydraulic cylinder group to be driven based on the operation amount of the operating device 5.

Specifically, the first pump flow rate is the sum of the distribution flow rate Qbk and the distribution flow rate Qa. The second pump flow rate is the distribution flow rate Qb.

The pump control unit 194 controls the first hydraulic pump 31 and the second hydraulic pump 32 based on the first pump flow rate and the second pump flow rate calculated by the pump flow rate calculation unit 193. In the splitting state in which the merging passage 55 is closed, the pump control unit 194 controls the servo mechanism 31B to adjust the inclination angle of the swash plate 31A of the first hydraulic pump 31 to adjust the flow rate of the operating oil discharged from the first hydraulic pump 31 to the first pump flow rate. Moreover, in the splitting state in which the merging passage 55 is closed, the pump control unit 194 controls the servo mechanism 32B to adjust the inclination angle of the swash plate 32A of the second hydraulic pump 32 to adjust the flow rate of the operating oil discharged from the second hydraulic pump 32 to the second pump flow rate.

[Control Method]

Figure 5:
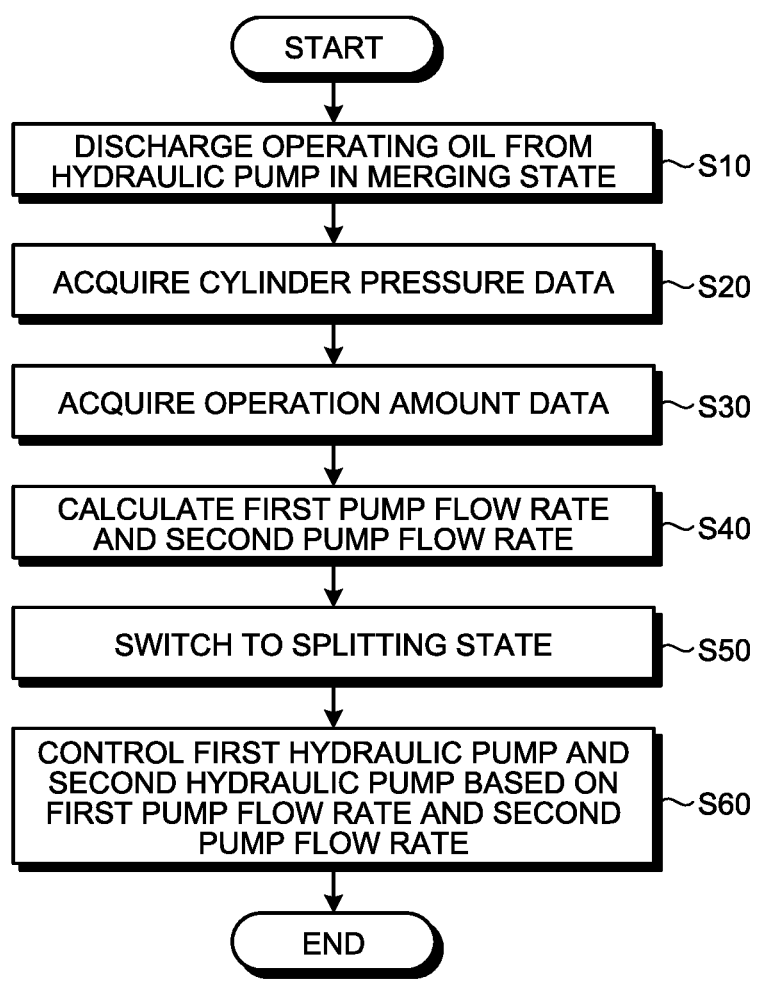
FIG. 5 is a flowchart illustrating an example of a control method according to the first embodiment.
Figure 6:
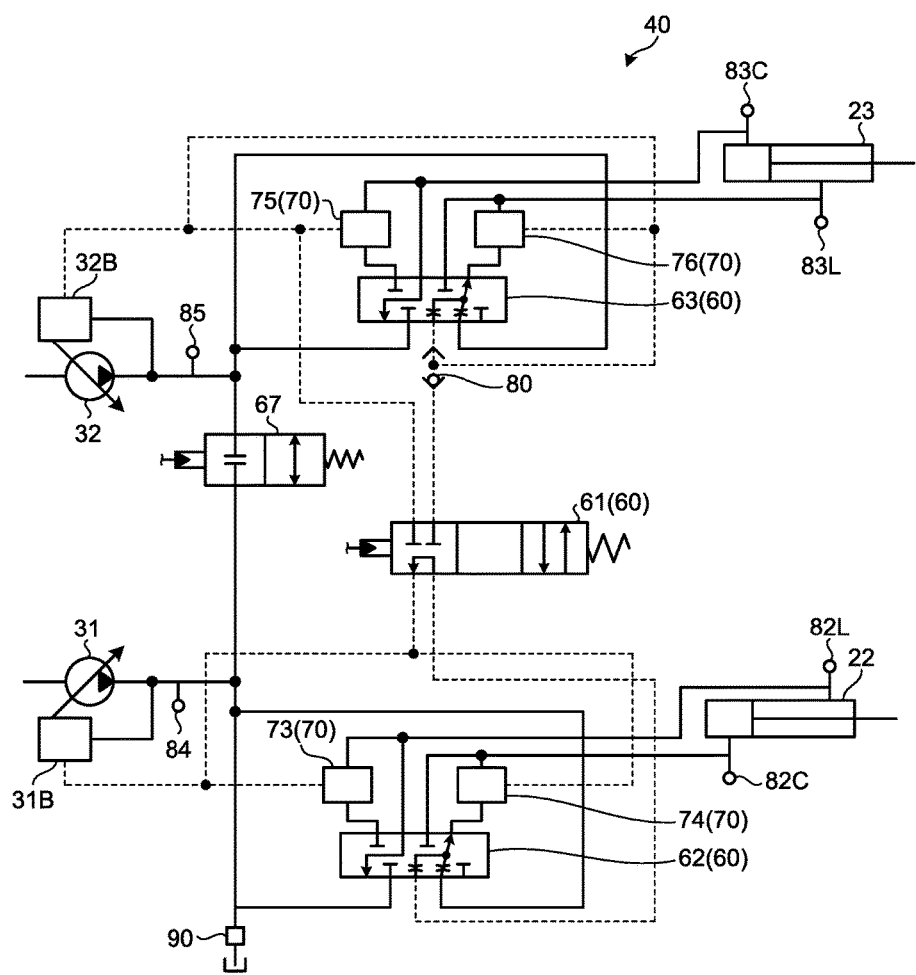
FIG. 6 is a diagram illustrating main parts of a hydraulic circuit of the work machine according to the first embodiment.

Next, a control method of the excavator 100 according to the present embodiment will be described. FIG. 5 is a flowchart illustrating an example of a control method of the excavator 100 according to the present embodiment. In the following description, in order to simplify the description, it is assumed that the hydraulic circuit 40 illustrated in FIG. 6 is a control target. FIG. 6 is a diagram illustrating main parts of the hydraulic circuit 40 described with reference to FIG. 3 and illustrates an example in which the first hydraulic cylinder group includes the arm cylinder 22 only and the second hydraulic cylinder group includes the boom cylinder 23 only.

Figure 7:
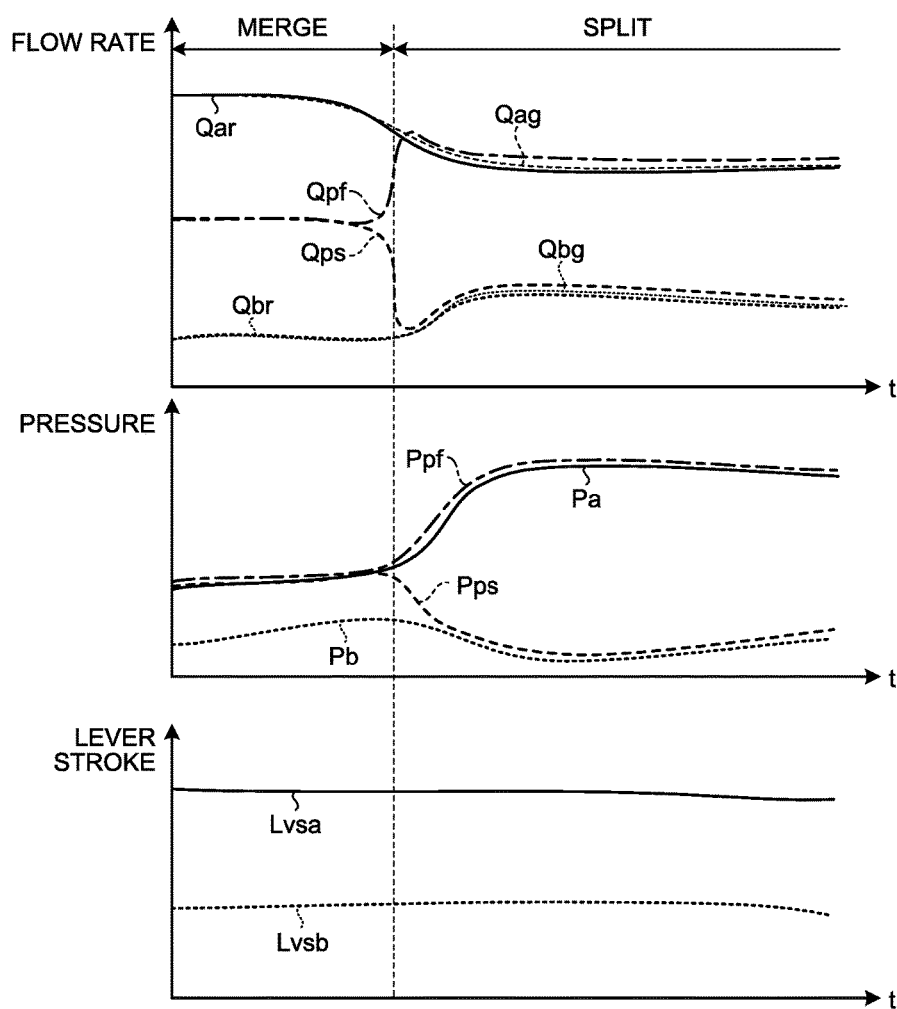
FIG. 7 is a diagram illustrating an example in which the flow rates of a hydraulic pump and a hydraulic cylinder according to the first embodiment, a discharge pressure of the hydraulic pump, and a lever stroke change with time.

FIG. 7 is a diagram illustrating an example in which the flow rates of the hydraulic pump 30 and the hydraulic cylinder 20 according to the present embodiment, the discharge pressure of the hydraulic pump 30, and a lever stroke indicating the operation amount of the operating device 5 change with time.

In the graph illustrated in FIG. 7, the horizontal axis is time t. Qag is an estimated value of the flow rate of the operating oil supplied to the arm cylinder 22, Qbg is an estimated value of the flow rate of the operating oil supplied to the boom cylinder 23, Qar is a true value of the flow rate of the operating oil supplied to the arm cylinder 22, and Qbr is a true value of the flow rate of the operating oil supplied to the boom cylinder 23. The estimated value Qag is the distribution flow rate Qa of the arm cylinder 22, calculated by the pump controller 19, and the estimated value Qbg is the distribution flow rate Qb of the boom cylinder 23, calculated by the pump controller 19.

The flow rate Qpf is the flow rate of the operating oil discharged from the first hydraulic pump 31 and the flow rate Qps is the flow rate of the operating oil discharged from the second hydraulic pump 32.

The pressure Ppf is the pressure of the operating oil discharged from the first hydraulic pump 31, and the pressure Pps of the pressure of the operating oil discharged from the second hydraulic pump 32. The pressure Pa is the pressure of the operating oil supplied to the arm cylinder 22, and the pressure Pb is the pressure of the operating oil supplied to the boom cylinder 23.

The lever stroke Lvsa is the stroke of the operating lever when the operating device 5 is operated to operate the arm 12. The lever stroke Lvsb is the stroke of the operating lever when the operating device 5 is operated to operate the boom 13.

In the merging state in which the merging passage 55 is open, the operating oil supplied to the arm cylinder 22 and the boom cylinder 23 is discharged from the first hydraulic pump 31 and the second hydraulic pump 32 (step S10). As illustrated in FIG. 7, the operating oil is discharged from the first hydraulic pump 31 at the flow rate Qpf and the operating oil is discharged from the second hydraulic pump 32 at the flow rate Qps.

The cylinder pressure data acquisition unit 191 acquires the cylinder pressure data indicating the pressure of the operating oil of the hydraulic cylinder 20 (step S20). As illustrated in FIG. 7, the cylinder pressure of the arm cylinder 22 is Pa and the cylinder pressure of the boom cylinder 22 is Pb.

Moreover, the operation amount data acquisition unit 192 acquires the operation amount data of the operating device 5 operated to drive the hydraulic cylinder 20 (step S30). As illustrated in FIG. 7, the operation amount for operating the arm cylinder 22 is the lever stroke Lvsa, and the operation amount for operating the boom cylinder 23 is the lever stroke Lvsb.

the pump flow rate calculation unit 193 calculates the first pump flow rate indicating the flow rate of the operating oil discharged from the first hydraulic pump 31 and the second pump flow rate indicating the flow rate of the operating oil discharged from the second hydraulic pump 32 in the splitting state in which the merging passage 55 is closed based on the cylinder pressure data and the operation amount data (step S40). The first pump flow rate is Qpf and the second pump flow rate is Qps.

The merging state in which the merging passage 55 is open switches to the splitting state in which the merging passage 55 is closed (step S50).

The pump control unit 194 controls the first hydraulic pump 31 and the second hydraulic pump 32 based on the first pump flow rate Qpf and the second pump flow rate Qps calculated by the pump flow rate calculation unit 193 when the merging state switches to the splitting state (step S60).

In the present embodiment, the first pump flow rate of the first hydraulic pump 31 and the second pump flow rate of the second hydraulic pump 32 are calculated based on the cylinder pressure data and the operation amount data. Therefore, as illustrated in FIG. 7, when the merging state switches to the splitting state, the operating oil is appropriately distributed to the arm cylinder 22 and the boom cylinder 23. That is, in the present embodiment, even when the merging state switches to the splitting state, the estimated value Qag of the flow rate of the operating oil supplied to the arm cylinder 22 can be made identical to the true value Qar, and the estimated value Qbg of the flow rate of the operating oil supplied to the boom cylinder 23 can be made identical to the true value Qbr.

Figure 8:
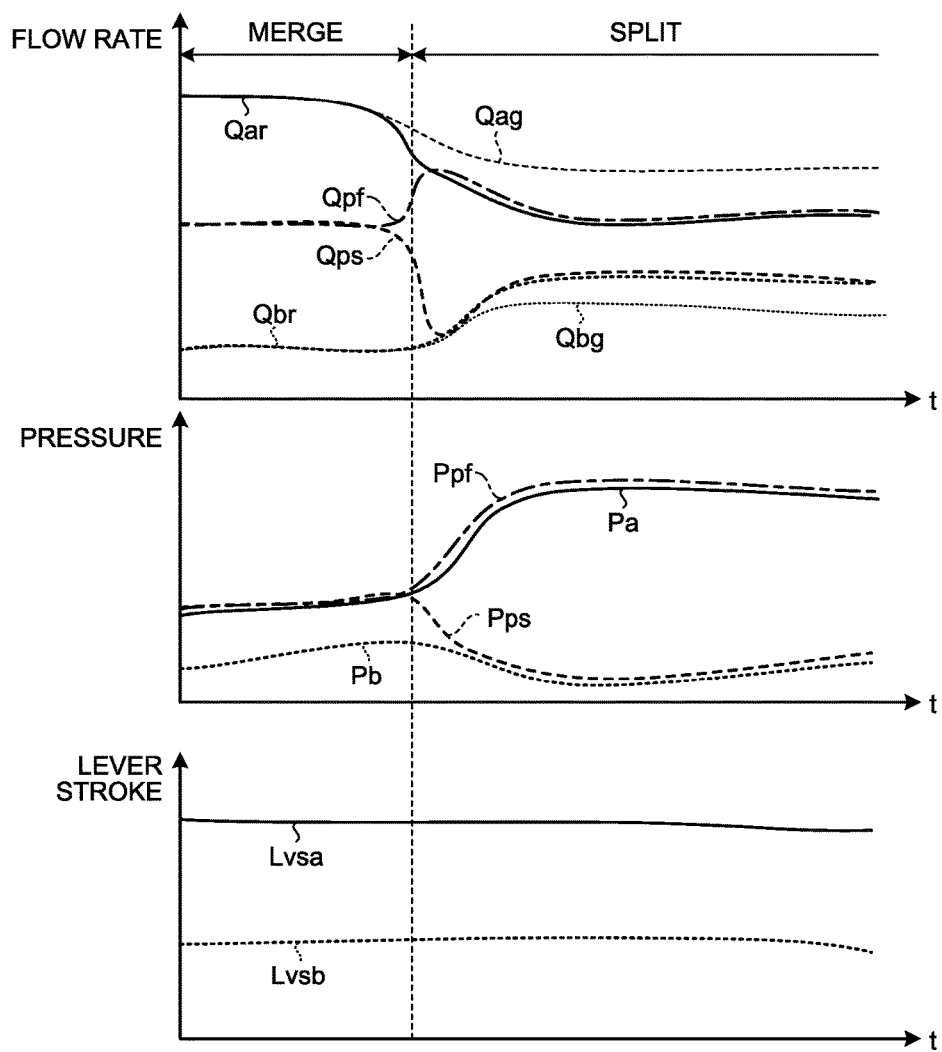
FIG. 8 is a diagram illustrating an example in which the flow rates of a hydraulic pump and a hydraulic cylinder according to a comparative example, a discharge pressure of the hydraulic pump, and a lever stroke change with time.

FIG. 8 is a diagram illustrating an example in which the flow rates of the hydraulic pump 30 and the hydraulic cylinder 20 according to a comparative example, the discharge pressure of the hydraulic pump 30, and the lever stroke change with time. FIG. 8 illustrates an example in which the flow rate of the operating oil discharged from the hydraulic pump 30 including the first hydraulic pump 31 and the second hydraulic pump 32 is adjusted based on the pump pressure of the operating oil discharged from the hydraulic pump 30. As illustrated in FIG. 8, in the comparative example, when the merging state switches to the splitting state, the estimated value Qag of the flow rate of the operating oil supplied to the arm cylinder 22 is not identical to the true value Qar, and the estimated value Qbg of the flow rate of the operating oil supplied to the boom cylinder 23 is not identical to the true value Qbr. In this case, the operating oil of the flow rate necessary for driving the working unit 1 is not sufficiently supplied to the hydraulic cylinder 20. As a result, the working unit 1 does not operate with a sufficient speed and responsiveness and the working efficiency deteriorates. Moreover, the operator operating the working unit 1 may experience a sense of incongruity.

According to the present embodiment, the first pump flow rate of the first hydraulic pump 31 and the second pump flow rate of the second hydraulic pump 32 in the splitting state in which the merging passage 55 is closed are calculated based on the cylinder pressure data and the operation amount data, and the first hydraulic pump 31 and the second hydraulic pump 32 are controlled based on the calculated first and second pump flow rates. Therefore, the working unit 1 is controlled with a sufficient speed and responsiveness.

Second Embodiment

A second embodiment will be described. In the following description, the same or equivalent portions as those of the above-described embodiment will be denoted by the same reference numerals, and description thereof will be simplified or omitted.

Figure 9:
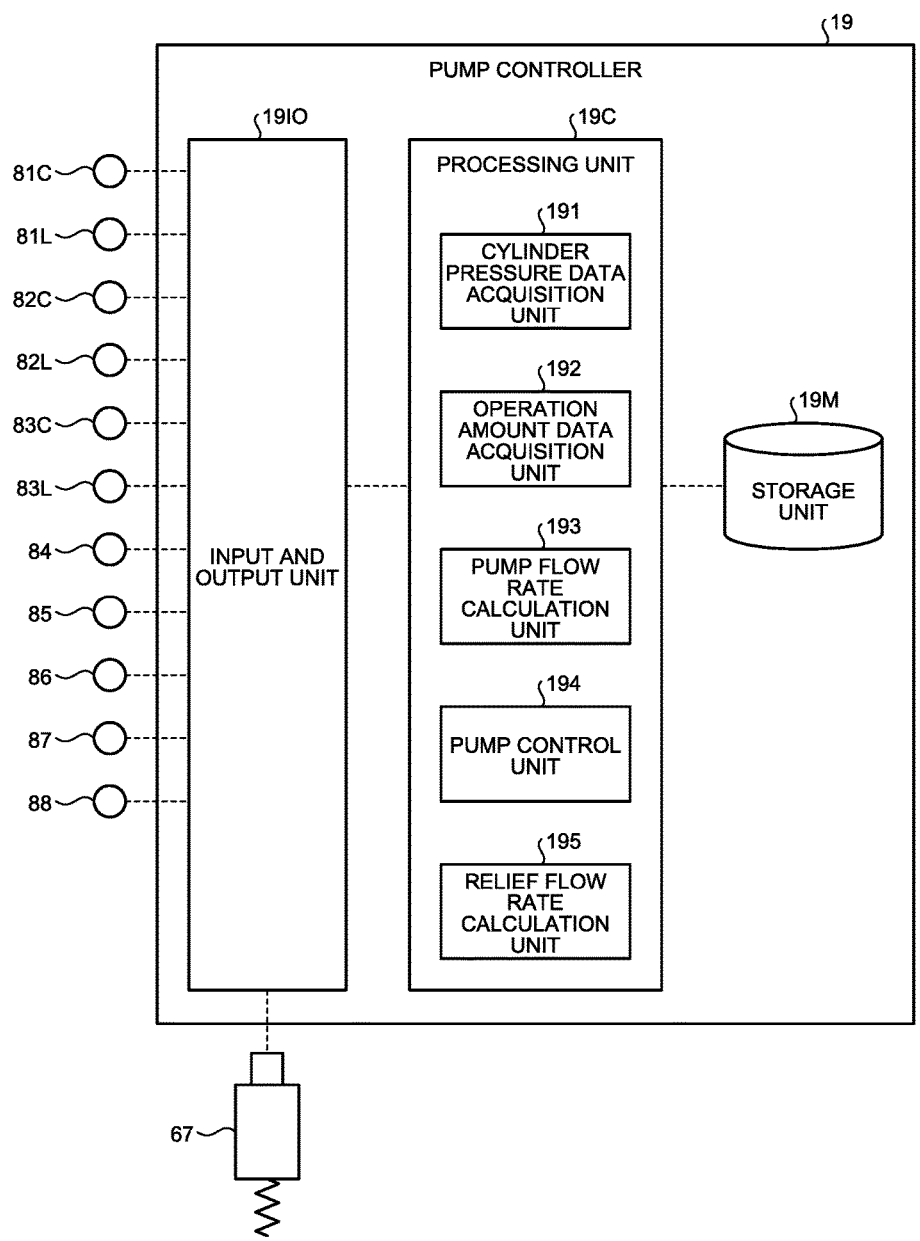
FIG. 9 is a functional block diagram illustrating an example of a pump controller of a work machine according to a second embodiment.

FIG. 9 is a functional block diagram illustrating an example of the pump controller 19 according to the present embodiment. In the present embodiment, the processing unit 19C includes a relief flow rate calculation unit 195 that calculates a relief flow rate Qz indicating the flow rate of the operating oil discharged outside the hydraulic circuit 40 via the relief valve 90 based on a pump limit flow rate Qlp indicating the flow rate of the operating oil that the hydraulic pump 30 including the first hydraulic pump 31 and the second hydraulic pump 32 can discharge and the sum (Qbk+Qa+Qb) of the distribution flow rates Q (Qbk, Qa, Qb) of the operating oil distributed to a plurality of hydraulic actuators 20 (the bucket cylinder 21, the arm cylinder 22, and the boom cylinder 23).

The pump control unit 194 controls the first hydraulic pump 31 and the second hydraulic pump 32 based on the relief flow rate Qz calculated by the relief flow rate calculation unit 195. In the present embodiment, the pump control unit 194 controls the hydraulic pump 30 so that an amount of operating oil larger by the relief flow rate Qz than the distribution flow rate Q required for operating the hydraulic cylinder 20 is discharged from the hydraulic pump 30.

The pump limit flow rate Qlp, the relief flow rate Qz, and the sum (Qbk+Qa+Qb) of the distribution flow rates Q of the operating oil distributed to the plurality of hydraulic actuators 20 satisfy the relation of Equation (6) below.

$$Qlp=(Qbk+Qa+Qb)+Qz \quad (6)$$

That is, when the operating oil is discharged via the relief valve 90, the hydraulic pump 30 needs to discharge the operating oil by taking the relief flow rate Qz discharged via the relief valve 90 into consideration. When the pump flow rate is determined without taking the relief flow rate Qz into consideration despite that the operating oil is discharged from the relief valve 90, the operating oil supplied to the hydraulic cylinder 20 may be insufficient and the operating oil of the flow rate required for driving the working unit 1 may not be sufficiently supplied to the hydraulic cylinder 20. As a result, the working unit 1 may not operate with a sufficient speed and responsiveness.

Figure 10:
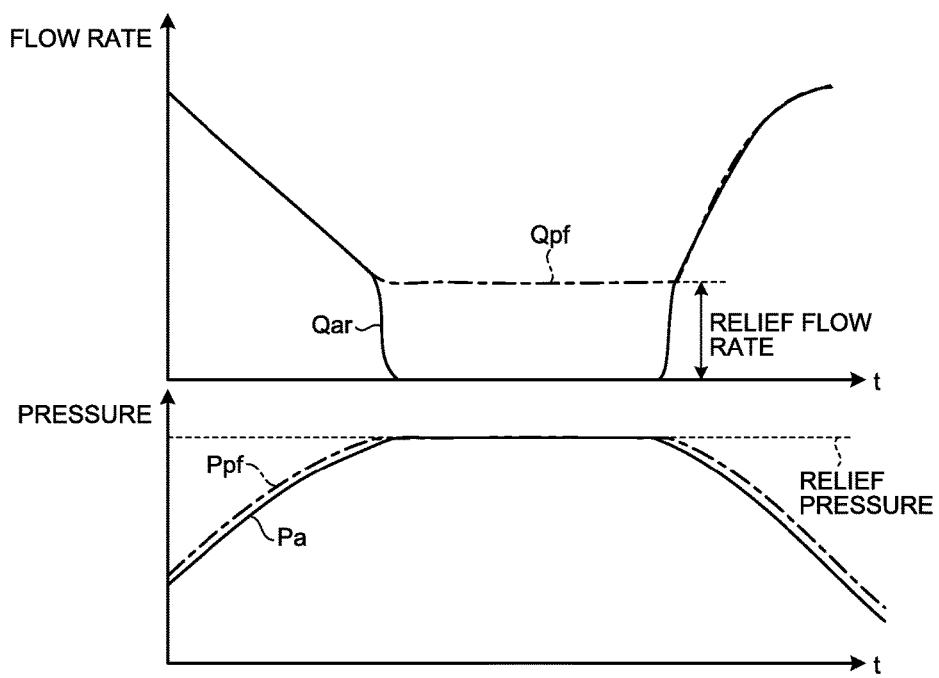
FIG. 10 is a diagram illustrating an example in which the flow rates of a hydraulic pump and a hydraulic cylinder according to a comparative example and a discharge pressure of the hydraulic pump change with time.
Figure 11:
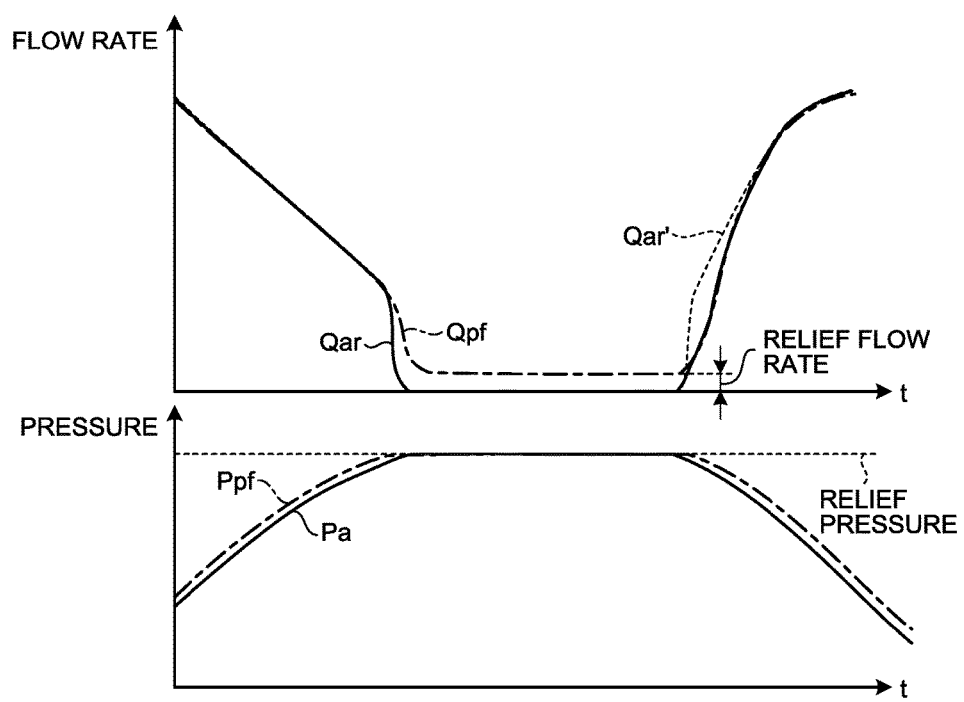
FIG. 11 is a diagram illustrating an example in which the flow rates of a hydraulic pump and a hydraulic cylinder according to a comparative example and a discharge pressure of the hydraulic pump change with time.

FIGS. 10 and 11 are diagrams illustrating an example in which the flow rates of the hydraulic pump 30 and the hydraulic cylinder 20 according to a comparative example and the discharge pressure of the hydraulic pump 20 change with time. FIG. 10 illustrates an example when the first hydraulic pump 31 and the second hydraulic pump 32 are controlled based on a pump pressure. FIG. 11 illustrates an example in which the relief flow rate Qz is not taken into consideration when the first hydraulic pump 31 and the second hydraulic pump 32 are controlled based on the pump flow rate as described in the embodiment.

As illustrated in FIG. 10, when the load of the working unit 1 increases and the pump pressure reaches the relief pressure, the flow rate Qa flowing into the hydraulic cylinder 20 reaches zero and the working unit 1 stops. After that, when the load of the working unit 1 decreases and the working unit 1 escapes from the relief state, since operating oil starts flowing into the hydraulic cylinder 20 from a state in which the pump flow rate is secured, the responsiveness is high.

Moreover, in the merging state, the hydraulic pump 30 tries to discharge operating oil within the range of a pump torque limit value and the operating oil is discharged from the relief valve 90 to some extent. In the example illustrated in FIG. 10, since the flow rate required by the hydraulic cylinder 20 is not estimated accurately, even when the distribution flow rate Qa required by the hydraulic cylinder 20 is zero, the hydraulic pump 30 discharges operating oil in the same manner as in the merging state.

As illustrated in FIG. 11, when the load of the working unit 1 decreases and the working unit 1 escapes from the relief state, since the operating oil starts flowing into the hydraulic cylinder 20 from a state in which the pump flow rate is the lowest, the increase in the flow rate Qar of the operating oil supplied to the hydraulic cylinder 20 is decelerated due to the limited responsiveness of the hydraulic pump 30. As a result, the operability deteriorates. In FIG. 11, the flow rate Qar' indicated by a dot line indicates the flow rate in the merging state, and the flow rate Qar indicated by a solid line indicates the flow rate in the splitting state.

Figure 12:
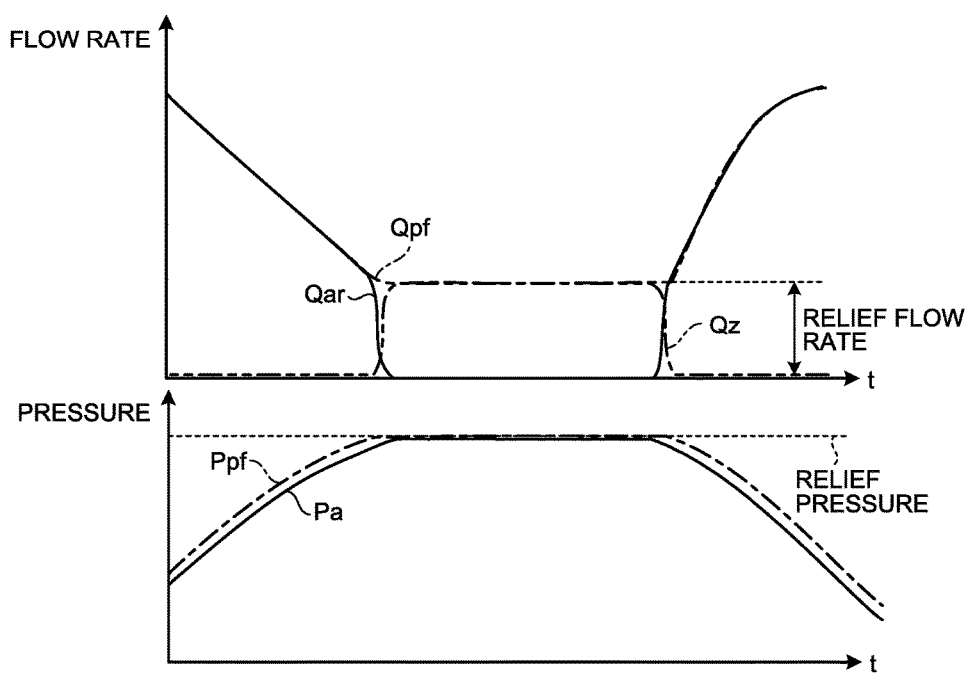
FIG. 12 is a diagram illustrating an example in which the flow rates of a hydraulic pump and a hydraulic cylinder according to a second embodiment and a discharge pressure of the hydraulic pump change with time.

As illustrated in FIG. 12, by taking the relief flow rate Qz into consideration, the flow rate of the operating oil required by the hydraulic cylinder 20 is estimated accurately. The pump control unit 194 can control the first hydraulic pump 31 and the second hydraulic pump 32 so that the operating oil of the flow rate required by the hydraulic cylinder 20 is discharged from the first hydraulic pump 31 and the second hydraulic pump 32. That is, in the relief state, the relief flow rate Qz of the operating oil discharged from the relief valve 90 in the merging state is estimated, and the first hydraulic pump 31 and the second hydraulic pump 32 are controlled so that the estimated relief flow rate Qz is discharged. In the relief state, the pump flow rate equivalent to that of the merging state is secured. A decrease in the responsiveness of the flow rate of the operating oil supplied to the hydraulic cylinder 20 when the hydraulic cylinder escapes from the relief state is suppressed.

While the embodiment has been described, the embodiment is not limited to the above-described content. Moreover, the above-described constituent elements include those that can be easily conceived by those skilled in the art, those that are substantially the same as the constituent elements, and those in the range of so-called equivalents. Further, the above-described constituent elements can be appropriately combined with each other. Furthermore, at least one of various omissions, substitutions, or changes in the constituent elements can be made without departing from the spirit of the embodiment.

REFERENCE SIGNS LIST

1 WORKING UNIT
2 UPPER SWING STRUCTURE
3 LOWER TRAVELING STRUCTURE
4 DRIVING DEVICE
5 OPERATING DEVICE
6 CAB
6S DRIVER'S SEAT
7 MACHINE ROOM
8 CRAWLERS
9 CONTROL SYSTEM
11 BUCKET
12 ARM
13 BOOM
14 STORAGE BATTERY
14C TRANSFORMER
15G FIRST INVERTER
15R SECOND INVERTER
16 ROTATION SENSOR
17 HYBRID CONTROLLER
18 ENGINE CONTROLLER
19 PUMP CONTROLLER
19C PROCESSING UNIT
19M STORAGE UNIT
19IO INPUT AND OUTPUT UNIT
20 HYDRAULIC CYLINDER
21 BUCKET CYLINDER
21A FIRST BUCKET PASSAGE
21B SECOND BUCKET PASSAGE
21C CAP-SIDE SPACE
21L ROD-SIDE SPACE
22 ARM CYLINDER
22A FIRST ARM PASSAGE
22B SECOND ARM PASSAGE
22C CAP-SIDE SPACE
22L ROD-SIDE SPACE
23 BOOM CYLINDER
23A FIRST BOOM PASSAGE
23B SECOND BOOM PASSAGE
23C CAP-SIDE SPACE
23L ROD-SIDE SPACE
24 TRAVELING MOTOR
25 ELECTRIC SWING MOTOR
26 ENGINE
27 GENERATOR MOTOR
28 OPERATION AMOUNT DETECTION UNIT
29 COMMON RAIL CONTROL UNIT
30 HYDRAULIC PUMP
30A SWASH PLATE
30S SWASH PLATE ANGLE SENSOR
31 FIRST HYDRAULIC PUMP
31A SWASH PLATE
31B SERVO MECHANISM
31S SWASH PLATE ANGLE SENSOR
32 SECOND HYDRAULIC PUMP
32A SWASH PLATE
32B SERVO MECHANISM
32S SWASH PLATE ANGLE SENSOR
33 THROTTLE DIAL
40 HYDRAULIC CIRCUIT
41 FIRST PUMP PASSAGE
42 SECOND PUMP PASSAGE
43 FIRST SUPPLY PASSAGE
44 SECOND SUPPLY PASSAGE
45 THIRD SUPPLY PASSAGE
46 FOURTH SUPPLY PASSAGE
47 FIRST BRANCH PASSAGE
48 SECOND BRANCH PASSAGE
49 THIRD BRANCH PASSAGE
50 FOURTH BRANCH PASSAGE
51 FIFTH BRANCH PASSAGE
52 SIXTH BRANCH PASSAGE
55 MERGING PASSAGE (PASSAGE)
60 MAIN OPERATING VALVE
61 FIRST MAIN OPERATING VALVE
62 SECOND MAIN OPERATING VALVE
63 THIRD MAIN OPERATING VALVE
67 FIRST MERGING AND SPLITTING VALVE (OPENING AND CLOSING DEVICE)
68 SECOND MERGING AND SPLITTING VALVE
70 PRESSURE COMPENSATION VALVE
71 PRESSURE COMPENSATION VALVE
72 PRESSURE COMPENSATION VALVE
73 PRESSURE COMPENSATION VALVE
74 PRESSURE COMPENSATION VALVE
75 PRESSURE COMPENSATION VALVE
76 PRESSURE COMPENSATION VALVE
81C PRESSURE SENSOR
81L PRESSURE SENSOR
82C PRESSURE SENSOR
82L PRESSURE SENSOR
83C PRESSURE SENSOR
83L PRESSURE SENSOR
84 PRESSURE SENSOR
85 PRESSURE SENSOR
86 PRESSURE SENSOR
87 PRESSURE SENSOR
88 PRESSURE SENSOR
90 RELIEF VALVE
100 EXCAVATOR (WORK MACHINE)
191 CYLINDER PRESSURE DATA ACQUISITION UNIT
192 OPERATION AMOUNT DATA ACQUISITION UNIT
193 PUMP FLOW RATE CALCULATION UNIT
194 PUMP CONTROL UNIT
195 RELIEF FLOW RATE CALCULATION UNIT
AX1, AX2, AX3 ROTATION AXIS
RX SWING AXIS

The invention claimed is:
1. A control system that controls a work machine including a working unit and a plurality of hydraulic cylinders that drives the working unit, comprising:
a first hydraulic pump and a second hydraulic pump that discharge operating oil to be supplied to the plurality of hydraulic cylinders;
a passage that connects the first hydraulic pump and the second hydraulic pump;
an opening and closing device that is provided in the passage so as to open and close the passage;
an operating device that is operated to drive the plurality of hydraulic cylinders;

a cylinder pressure data acquisition unit that acquires cylinder pressure data indicating a pressure of the operating oil of the plurality of hydraulic cylinders;

an operation amount data acquisition unit that acquires operation amount data of the operating device;

a pump flow rate calculation unit that calculates a first pump flow rate indicating a flow rate of the operating oil discharged from the first hydraulic pump and a second pump flow rate indicating a flow rate of the operating oil discharged from the second hydraulic pump in a splitting state in which the passage is closed based on the cylinder pressure data and the operation amount data;

a pump control unit that controls the first hydraulic pump and the second hydraulic pump in the splitting state based on the first pump flow rate and the second pump flow rate;

a relief valve that prevents an increase in a pressure of the operating oil; and a relief flow rate calculation unit that calculates a relief flow rate indicating a flow rate of the operating oil discharged via the relief valve based on a pump limit flow rate indicating a flow rate of the operating oil that the first hydraulic pump and the second hydraulic pump can discharge and a sum of distribution flow rates of the operating oil distributed to the plurality of hydraulic cylinders, wherein the pump control unit controls the first hydraulic pump and the second hydraulic pump based on the relief flow rate.

2. The control system according to claim 1, wherein in the splitting state, the first hydraulic pump discharges the operating oil to be supplied to a first hydraulic cylinder group including at least one of the hydraulic cylinders, in the splitting state, the second hydraulic pump discharges the operating oil to be supplied to a second hydraulic cylinder group including at least one of the hydraulic cylinders, the first pump flow rate is determined based on a flow rate of the operating oil required by the first hydraulic cylinder group to be driven based on the operation amount, and the second pump flow rate is determined based on a flow rate of the operating oil required by the second hydraulic cylinder group to be driven based on the operation amount.

3. The control system according to claim 2, wherein the working unit includes a bucket, an arm connected to the bucket, and a boom connected to the arm, the plurality of hydraulic cylinders includes a bucket cylinder that drives the bucket, an arm cylinder that drives the arm, and a boom cylinder that drives the boom, and the first hydraulic cylinder group includes the bucket cylinder and the arm cylinder and the second hydraulic cylinder group includes the boom cylinder.

4. The control system according to claim 1, further comprising:

a main operating valve that adjusts the flow rate of the operating oil supplied to the plurality of hydraulic cylinders based on a pilot pressure generated when the operating device is operated; and an operation amount detection unit that detects the pilot pressure, wherein the operation amount data is calculated based on a detection signal of the operation amount detection unit.

5. The control system according to claim 1, wherein when a merging state in which the passage is open is switched to the splitting state, the pump control unit controls the first hydraulic pump and the second hydraulic pump based on the first pump flow rate and the second pump flow rate calculated by the pump flow rate calculation unit.

6. A work machine comprising the control system according to claim 1.

7. A control method of controlling a work machine including a working unit and a plurality of hydraulic cylinders that drives the working unit, comprising:

discharging operating oil to be supplied to the plurality of hydraulic cylinders from a first hydraulic pump and a second hydraulic pump;

acquiring cylinder pressure data indicating a pressure of the operating oil of the plurality of hydraulic cylinders;

acquiring operation amount data of an operating device operated to drive the plurality of hydraulic cylinders;

calculating a first pump flow rate indicating a flow rate of the operating oil discharged from the first hydraulic pump and a second pump flow rate indicating a flow rate of the operating oil discharged from the second hydraulic pump in a splitting state in which a passage that connects the first hydraulic pump and the second hydraulic pump is closed by an opening and closing device based on the cylinder pressure data and the operation amount data;

controlling the first hydraulic pump and the second hydraulic pump in the splitting state based on the first pump flow rate and the second pump flow rate;

preventing an increase in a pressure of the operating oil using a relief valve; and calculating a relief flow rate indicating a flow rate of the operating oil discharged via the relief valve based on a pump limit flow rate indicating a flow rate of the operating oil that the first hydraulic pump and the second hydraulic pump can discharge and a sum of distribution flow rates of the operating oil distributed to the plurality of hydraulic cylinders, wherein the first hydraulic pump and the second hydraulic pump are controlled based on the relief flow rate.

* * * * *